United States Patent [19]

Van Sikle et al.

[11] 4,447,698

[45] May 8, 1984

[54] WELDING SYSTEM MONITORING AND CONTROL SYSTEM

[75] Inventors: Truman T. Van Sikle, Saline; Charles J. Drake, Detroit, both of Mich.

[73] Assignee: Kelsey Hayes Company, Romulus, Mich.

[21] Appl. No.: 534,066

[22] Filed: Dec. 18, 1974

Related U.S. Application Data

[63] Continuation of Ser. No. 338,453, Mar. 6, 1973.

[51] Int. Cl.³ .......................................... B23K 11/24
[52] U.S. Cl. .................................... 219/110; 219/111; 219/117.1
[58] Field of Search ............... 219/108, 109, 110, 117, 219/137, 130, 131 R, 111, 117.1

[56] References Cited

U.S. PATENT DOCUMENTS

| | | | |
|---|---|---|---|
| 3,141,950 | 7/1964 | Chlasson | 219/89 |
| 3,518,395 | 6/1970 | Vanderhelst | 219/110 |
| 3,518,399 | 6/1970 | Vanderhelst | 219/110 |
| 3,586,815 | 6/1971 | Eijinsbergen et al. | 219/110 |
| 3,588,438 | 6/1971 | Vanderhelst | 219/117 |
| 3,654,424 | 4/1972 | Vanderhelst | 219/110 |
| 3,662,146 | 5/1972 | Vanderhelst | 219/110 |
| 3,670,138 | 6/1972 | Schmiege et al. | 219/110 X |
| 3,717,865 | 2/1973 | Hughs, Jr. | 219/110 X |
| 3,746,829 | 7/1973 | Petzoid | 219/110 |
| 3,748,431 | 7/1973 | Melband et al. | 219/97 |

Primary Examiner—C. C. Shaw

[57] ABSTRACT

A monitoring and control system for use in conjunction with a pulse type welder which utilizes a computer to calculate the impedance characteristics of a weld and compare these characteristics to a preselected set of characteristics to determine if a quality weld has been made. The system then controls the heat and cool time to increase or decrease the tmeperature of the weld and thus control the size of the weld nugget. The monitoring control system is utilized in conjunction with a standard pulse welding control system, which standard system provides a series of heat impulses followed by a series of cool impulses, this cycle being repeated for a preselected number of cycles. The monitoring and control system senses the voltage and current in the welding load and feeds this data to a computer which, in turn, calculates the impedance of the weld. This calculation is then compared to a predetermined set of standards which are evolved as a result of processing a preselected number of previous welds, and corrections are made to assure the weld quality. If the temperature of the weld has not been sufficiently elevated, the number of impulses in the cool portion of the cycle, and thus the cool time, is reduced until the weld meets the set standards. On the other hand, if the temperature exceeds the standard, the number of heat impulses, and thus the heat time, is reduced.

58 Claims, 17 Drawing Figures

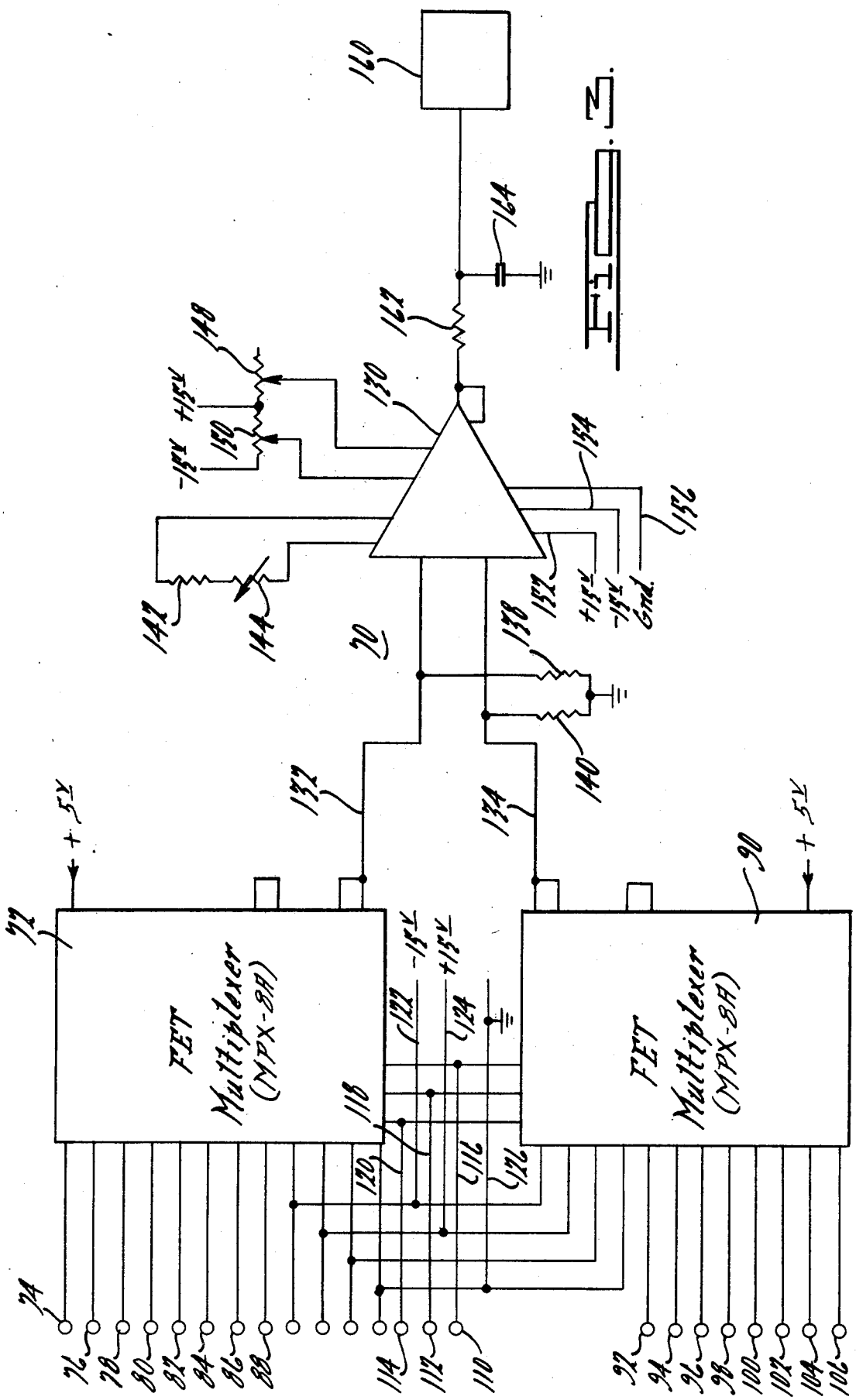

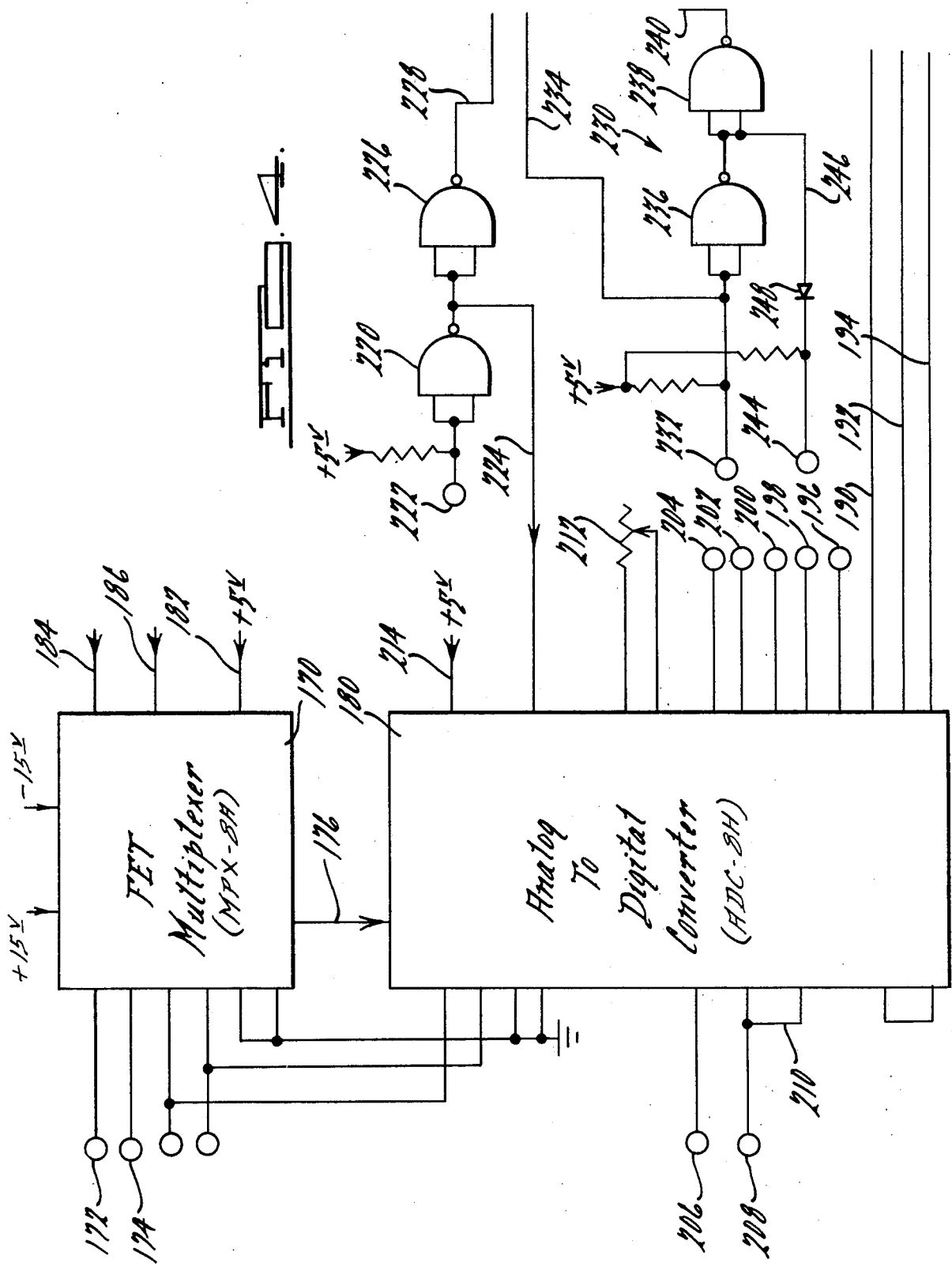

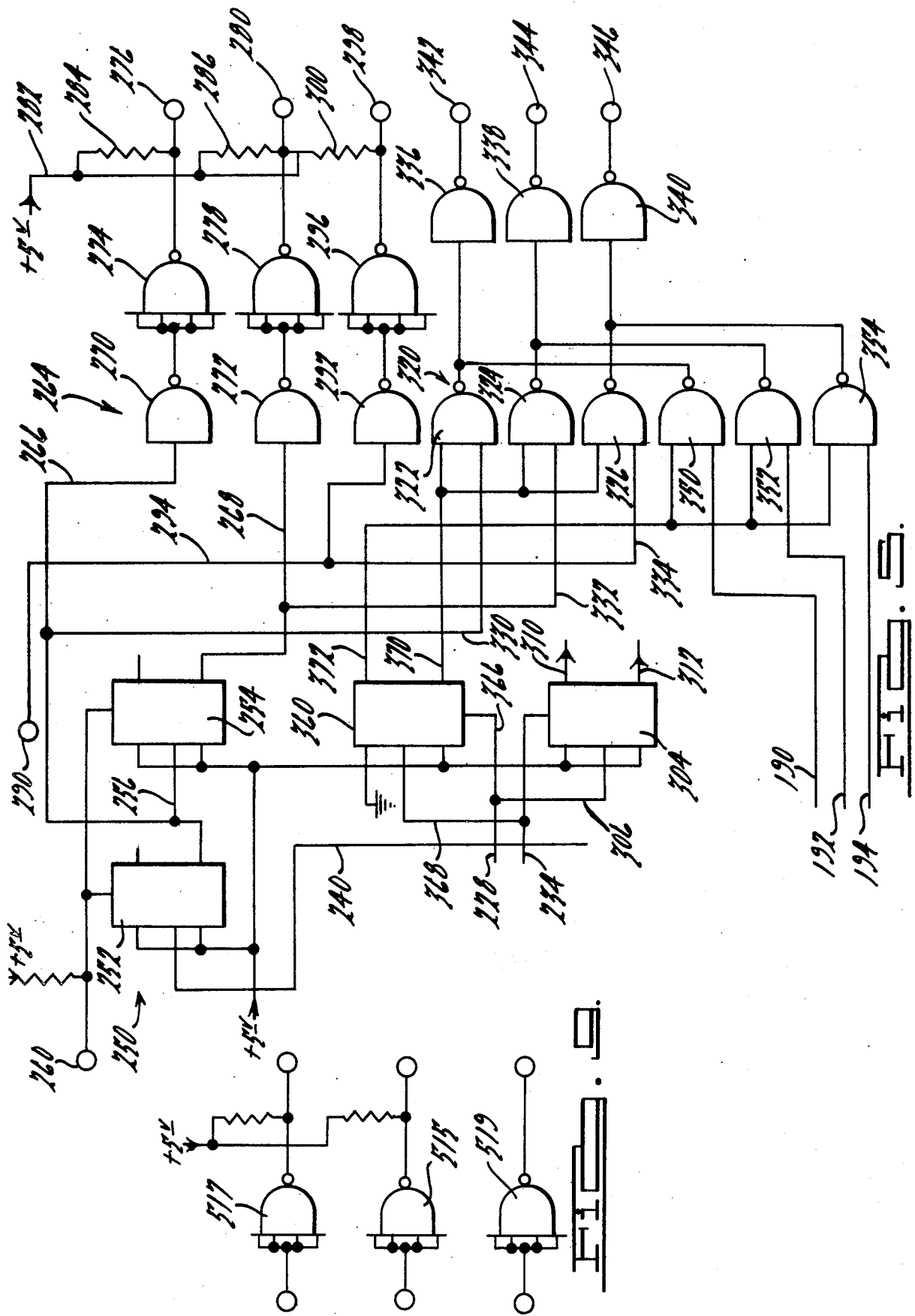

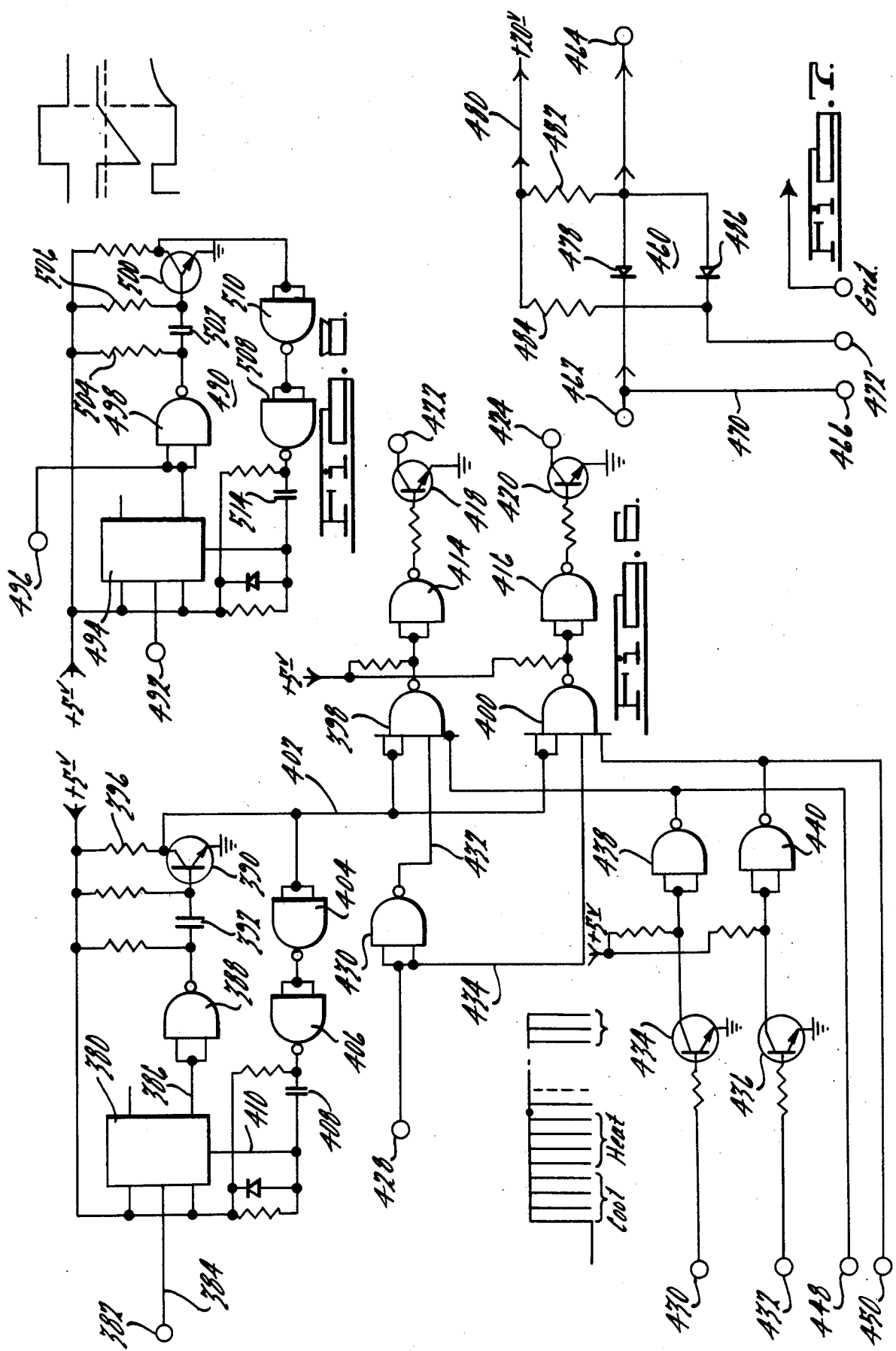

WELDING SYSTEM MONITORING AND CONTROL SYSTEM

This is a continuation of application Ser. No. 338,453, filed Mar. 6, 1973.

The monitoring and control system monitors both the voltage and current flowing in the welding load, the load consisting of one or more welding heads, and this data is fed to the computer through an analogue to digital computer. In the case of multiple heads, the voltage and current characteristics of the load are sequentially sensed. The voltage is initially sensed and momentarily stored and then the current is sensed with a ten microsecond delay between measurements. This data is fed to the computer and the resistance or impedance calculation is made by the computer. The computer then compares the average of all the samples for a particular head with a standard deviation and a determination is made which correction is required to bring the weld into the limits set by the standard deviation. If the weld cannot be brought into limits, a paint spray gun or other out of limits indicating device is actuated. If the correction is within the maximum allowed, a correction is made to bring the impedance closer to a mean value. Typically, a shortening of the heat or cool time is made to minimize the amount of time required to complete a weld.

If a correction is to be made, a signal is sent from the computer to effect the correction, whether it be a shortening of the cool time or a shortening of the heat time. In a typical standard pulse welder controller, the heat and cool times are controlled by counting the number of impulses occurring in the heat or cool time. If it is desired to shorten the heat time, an artificial pulse is generated by the computer and fed to the typical pulse weld controller to simulate an extra heat impulse. A similar situation occurs in connection with shortening the cool time. The typical pulse weld controller then counts the simulated pulse, in addition to the actual pulses generated, and turns off the heat or cool cycle in accordance with the number of actual and simulated pulses counted. As a further consideration, additional control of the weld could be obtained by absorbing a heat or cool time impulse generated within the standard pulse welder controller, thus fooling the standard control circuit into operating with a greater number of pulses in the heat or cool cycle than have actually been counted. Thus, as a further control, the duration of the weld cycle (both the heat and cool times) could be lengthened or shortened. However, the most efficient use of the system occurs when the heat and cool times are shortened to control weld quality.

The monitoring and control system further includes a program for updating the standard deviation parameter set within the computer. This is accomplished by continuously monitoring the deviation of the work being welded and accumulating the samples for the past weld. This data is weighted by a multiplier factor to weight the old and new data in accordance with the desired results to be accomplished by the monitor and control system. Said system also includes a print out for providing output information as to the past history of the welding production of a particular line.

BACKGROUND AND SUMMARY OF THE DEVELOPMENT

This invention relates generally to a computer controller monitoring and control system for a welder and more particularly for a monitoring and control system for calculating the impedance of a welding load connected to a pulse welder and utilizing this impedance information to determine the internal temperature of the weld and thus determine the quality of the nugget developed during the weld. This is accomplished by generating or absorbing certain counting pulses which are utilized to control the duration of the heat and cool time during the welding cycle.

As is commonly known, a spot weld is created by passing large current pulses, in the case of a pulse welder, through the two pieces of metal to be welded. This current causes heating at the work-to-work interface, the bulk of the available energy being dissipated at this interface due to the fact that the highest electrical resistance point occurs at the interface. Other points in the electrode-to-electrode assembly may dissipate some energy due to resistance between the electrode and work, and certain other factors. Most conductive materials have a resistivity that depends on the material temperature. Thus, as the temperature increases, the resistivity also increases. Therefore, the resistance of a weld nugget is an indicator of its temperature and the impedance history of a spot weld provides an insight into the distribution of energy dissipated during the creation of that weld. Accordingly, by using selected instrumentation that allows for accurate measurement of the weld impedance, a non-destructive determination of weld quality may be made during the formation of the weld.

The resistance of a weld during the course of the weld can be approximated as the solution to an integral equation. This equation is derived here and the solution is obtained. Two assumptions are required to define the problem.

1. Heat loss from the weld is proportional to the time integral of the temperature difference between the weld and the heat sink.
2. Temperature rise is proportional to net input energy.

These assumptions lead to the following integral equation which describes the weld temperature rise.

$$T - T_o = s \int_0^t ei\, dx - k \int_0^t (T - T_i)\, dx \tag{1}$$

where
 $T$ = weld temperature
 $T_o$ = initial system temperature
 $T_i$ = heat sink temperature
 $ei$ = power input to the weld
 $k$ = the ratio of thermal conductivity to specific heat
 $s$ = reciprocal of specific heat Material resistivity varies with temperature according to the following expression, $$\rho = \rho_o(1 + \eta T)$$

where $\rho_o$ is the resistivity of the material at zero degrees centigrade and $\eta$ is a physical constant of the material being tested. Initial resistivity is converted into resistance by $$R_o = \rho_o(L/A)$$

where L is the path length and A is the cross sectional area of the conducting path. It follows that, if a constant current source is used for the weld, $$T - T_o = I^2 R_o s \int_0^t (1 + \eta T)dx - k \int_0^t (T - T_i)dt \quad (2)$$

or $$T = (I^2 R_o s + kT_i)t = (I^2 R_o s \eta - k) \int_0^t T dx + T_o \quad (3)$$

A solution to this equation is found with the aid of Laplace transforms to be $$T = \frac{sI^2 R_o + kT_i}{k - s\eta I^2 R_o} + \left(T_o - \frac{kT_i + sI^2 R_o}{k - s\eta I^2 R_o}\right) \exp -(k - s\eta I^2 R_o)t \quad (4)$$

This solution is verified by substitution of it into Equation 2. The equation must be examined to determine if it satisfies all physical requirements. Under the condition that I=0, the temperature becomes $$T = T_i + (T_o - T_i)e^{-kt} \quad (5)$$

which indicates that the system temperature approaches the heat sink temperature. From Equation 4, an unstable condition appears to arise when $s\eta I^2 R_o$ is equal to k. However, further analysis shows that the solution is stable at this condition. This stability is shown by L'Hospital's rule. Let $$M = sI^2 R_o + kT_i$$

$$N = k - s\eta I^2 R_o$$

and Equation 4 becomes $$T = \frac{M}{N} + \left(T_o - \frac{M}{N}\right) e^{-Nt}$$

L'Hospital's rule shows that $$\lim_{N \to 0} \left(\frac{M}{N} + \left(T_o - \frac{M}{N}\right) e^{-Nt}\right) = T_o$$

which indicates that $s\eta I^2 R_o = k$ corresponds to the condition that added energy exactly matches energy lost to the cooling system so that no temperature change is observed. This condition cannot occur unless $\eta$ has a non-zero value. Otherwise the temperature must either rise or fall at an exponential rate. The remaining case where $$k < s\eta I^2 R_o$$

corresponds to the induction of heat at a rate so great that the heat sink is unable to establish a maximum temperature. Here the weld temperature will increase without bound until stopped by self-destruction. This case is not of interest in this analysis.

The terms M/N are temperature equivalent terms that depend on both material and weld parameters. When $$k \leq s\eta I^2 R_o$$

the term represents the end point temperature that the weld will approach and the weld can either cool or heat depending on the end temperature magnitude. Therefore let $$T_f = \frac{kT_i + sI^2 R_o}{k - s\eta I^2 R_o}$$

and the weld temperature becomes $$T = T_f + (T_o - T_f)e - (k - s\eta I^2 R_o)t \quad (6)$$

It is therefore established that Equation 6 is a solution to the original integral equation that meets all physical requirements, and the resistance of the weld is written $$R = R_o(1 + \eta T_f + \eta(T_o - T_f)e - (k - s\eta I^2 R_o)t) \quad (7)$$

For small values of $(k - s I^2 R_o)$ this expression can be approximated by $$R = R_o(I + \eta T_o + \eta(T_f - T_o)(k - s\eta I^2 R_o)$$

which is abbreviated to $$R = At + B$$

where $$B = R_o(I + \eta T_o) \quad (8)$$

and $$A = R_o \eta (T_f - T_o)(k - s\eta I^2 R_o) \quad (9)$$

Equations 8 and 9 describe completely the transient impedance of a weld.

The weld time is broken into segments of heat and cool times. At the beginning of each time period, the initial temperature is $T_o$. During a heating impulse, Equation 8 describes the rise in resistance with time. During cool the form of Equation 9 changes to $$A = R_o \eta (T_i - T_o)k$$

which is obtained from Equation 5 or equally well from Equation 9 when I=0.

There are three distinct real time corrections that can be applied to a weld controller to improve weld quality. Each correction can be applied individually or in combination with others depending on the magnitude of the correction needed on the design of the particular controller.

It follows from Equation 6 that during the heat cycle, the weld temperature traverses an exponentially damped transition from the initial nugget temperature toward $T_f$. These boundaries will not be altered by an adjustment of heat time, but rather the temperature will progress to a different value along the same prescribed path. A derivative approximation is used to estimate the effect of the heat time adjustment. Assume that $(k-s\eta I^2 R_o)$ is small and the time rate of change of Equation 6 becomes $$\Delta T \sigma (T_f - T_o)(k - s\eta I^2 R_o)\Delta t \quad (10)$$

and the change in R is merely $$\Delta R = R_o(T_f - T_o)(k - s\eta I^2 R_o)\Delta t \quad (11)$$

The above equations demonstrate two factors. If the heat time in a pulse welder is increased (by a small amount relative to the initial heat period), the end point temperature rise will increase linearly with respect to the heat time and the increase in resistance is also linearly proportional to the increase in heat time. It is to be noted from a later discussion that the beginning of weld phase II is marked by a minimum beginning impulse temperature in excess of the melting temperature of the material being welded.

The object of the control system is to force the resistance or temperature of the weld to follow a prescribed path throughout the weld. It can therefore be safely postulated that corrections applied will follow the theoretical formulation.

Three types of corrections are evident; current or phase adjustment, heat time and cool time adjustment. The curves shown in FIG. 1A demonstrate the effects of altering these parameters on the weld temperature, or resistance, for a particular impulse. Modification of phase or current raises or lowers $T_f$ correspondingly. The effects of this type of parameter modification is shown in FIG. 1A. Because the exponential rise rate is not affected only slightly by a change in $T_f$, only a small change in peak temperature and similarly in the weld temperature at the end of the cool cycle is obtained. Such a correction is a good vernier adjustment but has limited application as a feed-back control system. If a measurement determines that the weld progress is not within acceptable limits it is desired that a correction be made to the impulse being sampled. Phase correction can be made immediately upon determination of the requirement; however, time is required to find if the correction is necessary. Effects of this delay are shown in FIG. 1B. Here note that the end effect in temperature is reduced in proportion to the delay in beginning of the correction.

Heat time corrections effects are shown in FIG. 1C. Note here that the effect of increasing heat time is relatively small when compared with the effect of shortening the cool time. Therefore to slow progress of a weld, shortening heat time has a significant effect.

In FIG. 1D there is shown the effects of altering the cool time. Note here that the effect is similar in magnitude if the cool time is either lengthened or shortened. From the standpoint of maximum production efficiency, it is desired that the weld time always be shortened rather than lengthened. Therefore, heat should be added to the system by shortening the cool time, and heating should be slowed by shortening the heat time.

All three of the available weld parameters alter the temperature or resistance history of the weld in a manner that would be expected by intuition. Choice of the most appropriate correction depends upon the system on which the loop is being closed. In the system of the present invention, it has been found desirable to make the corrections in the early part of the weld cycle. In resistance spot welding, the weld nugget is formed in two phases, the first phase being utilized to bring the work up to the melt temperature of the work material and the second phase being utilized to maintain that temperature to permit the nugget to grow. Accordingly, as the impulses during the heat portion of the cycle are sensed, the impedance is calculated and compared to the preselected desired curve and corrections are made to insure that the temperature of the weld, as it is being brought up to the preselected temperature, fits that curve. It is during this first phase that the corrections are generally made.

The system to be described in presenting the concepts of the present invention include a standard pulse welder controller presently available on the market. This standard controller typically comprises a system for counting impulses during alternate heat and cool cycles and a circuit for switching the control of the energy from heat to cool in an alternate fashion. The system of the present invention is adapted to be interconnected with the standard pulse welder to sense when a heat portion of the cycle is occurring and when a cool portion of the cycle is occurring. The novel system then determines whether a correction is to be made and whether that correction should be such to apply more or less heat to the work interface. If it is determined that more heat should be applied in a typical situation, the cool cycle will be shortened by generating one or more additional cool impulses within the novel system and feeding these additional cool impulses to the standard welder control to be counter by that standard control. Thus, the standard control is fooled into counting a pulse generated outside of the standard control to shorten the cool cycle. In the case of lengthening the cool cycle, one or more of the cool impulses is precluded from being counted by the standard control. This could occur by shunting a cool impulse or by maintaining a voltage level at the input circuit at the counter at a particular level such that it appears that an impulse has not been generated when in fact one or more impulses have been generated in a circuit prior to the counter.

The novel system includes any general purpose, digital computer which is fed data from the welder heads and the computer is utilized to generate output commands to the standard controller. In the preferred embodiment, an Alpha 16 minicomputer manufactured by Computer Automation, Inc. is used. In one embodiment of the invention, voltage sensing leads are interconnected with the welder electrodes to sense the voltage across the work. Also, additional connections are made to accurately sense the current flowing through the work, these measurements being made by standard methods such as standard shunts connected to a portion of the welder load circuit, etc. It is presently contemplated that the voltage will be measured first and then stored for a short period of time until the current is measured. These signals are fed through an analogue to digital converter and control circuit to the computer, the voltage and current data being fed to the computer and control signals being fed from the computer to the converter to control when the voltage and current are sensed. The computer then calculates the impedance of the weld and produces control signals for use by the standard welder controller.

In a typical system, the computer is ordinarily set up to sense a preselected number of load welds, the welds being controlled to produce a desired nugget characteristic. The computer then calculates the impedance for these welds, the number of welds being in the neighborhood of fourteen for each head being controlled and generates the desired mean curve. The computer then calculates standard deviations for that curve to set up maximum and minimum deviation limits which are acceptable for welds to be performed under the standards set up. The computer then compares future welds with the standards programmed into the computer to determine whether a correction is to be made and whether a correction can be made (the weld is out of limits). The computer also includes a system for updating and weighting additional data being fed during the future welds to permit following of the weld standards to any drift in the welding cycle which may occur as a result of deterioration in the weld electrodes or some other subtle drift in the weld quality.

The system further includes a welder interface circuit for interfacing the computer control signals with the standard welder control. Further, the system includes diagnostic circuits for indicating when a correction is being made and for indicating when a correction cannot be made to mark the work for discard or reworking.

Accordingly, it is one object of the present invention to provide an improved welder control system.

It is another object of the present invention to provide an improved resistance pulse welding control system.

It is another object of the present invention to provide an improved control system for use in conjunction with a standard impulse welder control system.

It is a further object of the present invention to provide an improved system for calculating the impedance characteristics of a weld as it is being accomplished and comparing the calculated impedance characteristics with the preselected characteristics to determine the progress of the weld.

It is still another object of the present invention to provide an improved pulse welder control system which is capable of comparing weld characteristics with a preselected characteristic standard and applying corrections to the welder to force the weld characteristics to conform to the preselected standard characteristics.

It is still a further object of the present invention to provide an improved impulse welder control which is capable of controlling a multiple number of welder heads and calculating the weld impedance as each impulse of weld current is applied to the work.

It is still a further object of the present invention to provide an improved system such as described in the previous object and apply corrective action to the weld after each weld impulse is applied to the weld to insure that the weld conforms to preselected standards.

It is still another object of the present invention to provide an improved welder control system as described which has the capability of applying corrective action to the weld as it is being applied to the work by shortening or lengthening either the cool or heat portion of the weld cycle to insure that the temperature of the weld follows certain preselected standards.

It is another object of the present invention to provide an improved resistance welder control system which is capable of indicating when corrective action is being taken and when the weld is such that corrective action cannot be taken.

It is a further object of the present invention to provide an improved pulse welder control system which is inexpensive to manufacture, easily installed and reliable in operation.

It is a further object of the present invention to provide an improved welder control system for correcting standard weld procedures and which is capable of being interconnected with standard resistance welding control circuits.

Other objects and features of the invention will become apparent from a study of the following specification, the appended claims and the attached drawings in which:

FIG. 1 is a composite diagram illustrating the progress of an impulse of a weld as corrective action is being taken wherein FIG. 1A illustrates the progress of the weld as phase or current modifications are made, FIG. 1B illustrates the phase or current modifications as applied with a delay, FIG. 1C illustrates corrective action applied to the heat time, and FIG. 1D illustrates correction being applied to the cool time;

FIG. 3 is a schematic diagram illustrating the voltage and current sensing circuits for applying data to the computer;

FIG. 4 is a portion of the schematic diagram illustrating the analogue to digital converter and control circuit and particularly illustrating the multiplexer circuit for controlling the sensing and feeding of voltage and current data from the welder and to the computer respectively, and the analogue to digital converter circuit;

FIG. 5 is the remaining portion of the analogue to digital converter and control circuit and particularly illustrating the schematic details of the welder head counter circuit, the voltage to current switching circuit and the output address and data buss gates;

FIG. 6 is a schematic diagram illustrating a portion of the details of the welder interface and particularly illustrating the circuit for generating heat or cool time fooler impulses or impulse absorbing circuits;

FIG. 7 illustrates additional details of the welder interface and particularly the circuit for interconnecting FIG. 6 with the standard welder controller;

FIG. 8 is a schematic diagram illustrating the details of a single shot multivibrator circuit utilized in connection with controlling the impulses counted by the standard welder FIG. 9 is a schematic diagram illustrating the details of a circuit which is interconnected with the welder heads to signal the computer when the welder heads are down;

DETAILED DESCRIPTION OF THE DRAWINGS

This invention relates generally to a control system for a resistance welder, and more particularly to a control system for an impulse welder which is adapted to be interconnected with a standard resistance impulse welder control system, the novel system being capable of analyzing the progress of a resistance weld and taking corrective action to force the weld to progress within preselected temperature standards.

Figure 1:
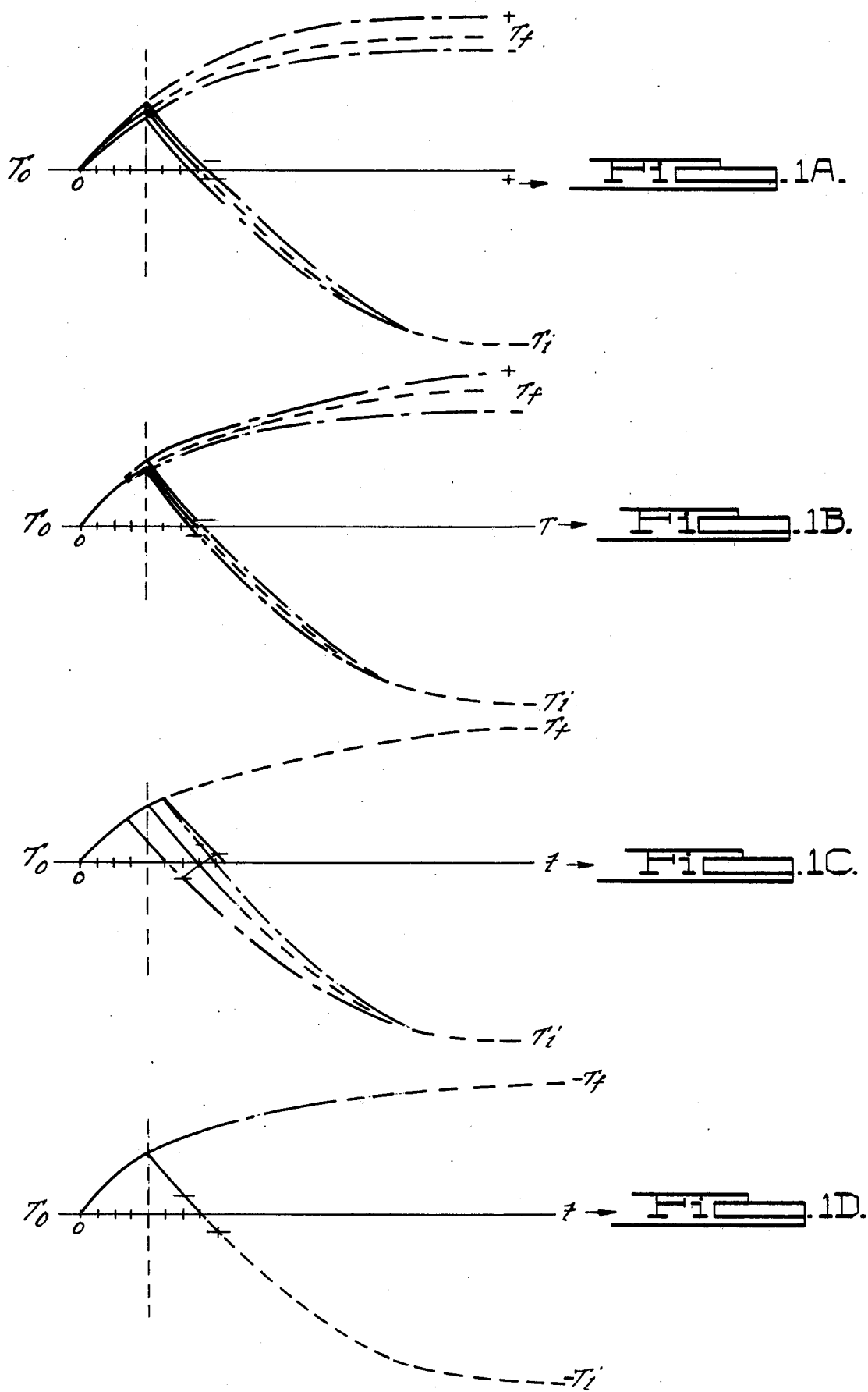
Figure 2:
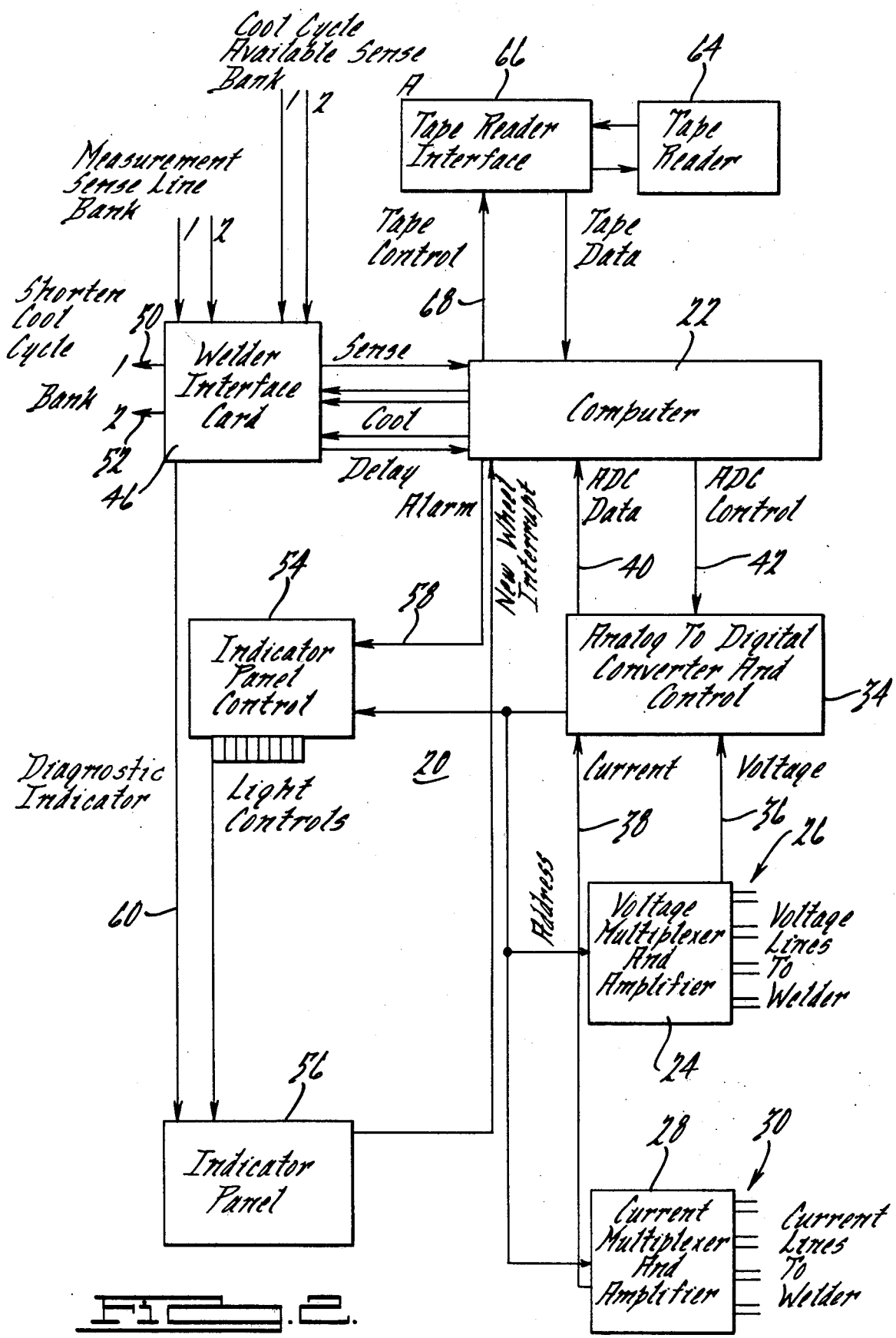
FIG. 2 is a block diagram illustrating the overall system of the present invention including the computer and the interface adapted to be connected to the standard welder control system.

Referring now to FIG. 2, FIG. 1 having been described above, there is illustrated a general block diagram of the system 20 which includes a computer 22 as the basic element of the system. The computer 22 is utilized to provide all of the calculations of the system in addition to generating a preselected mean temperature curve and also calculates standard deviations, plus and minus, from that curve to set the maximum and minimum limits outside of which the corrective action is taken. Obviously, if the weld remains outside of those limits, corrective action has not been effective and the computer provides an output signal to indicate to the operator that the particular weld is defective. In the situation of the particular system to be described, a paint gun is actuated to spray the part having the defective weld or the work is shunted aside.

As stated above, the system senses the voltage and current being fed to the welding load. The system of the present invention will be described as being utilized with two banks of multiple welding heads, in this case four welding heads per bank. Also, in the system of the present invention, the weld cycles have been set up with a series of five heat cycles containing four impulses per heat cycle separated by cool cycles having approximately three impulses per cool cycle. Thus, the system of the present invention is capable of scanning the first bank of four heads for each impulse of the heat portion of the cycle. The system then switches to the second bank and accomplishes the same sequential sensing of each impulse of each head within the bank.

To this end, a voltage multiplexer and amplifier circuit 24 is provided which includes a plurality of input lines 26 connected to each head of the multiple welder system. The current is sensed by means of a current multiplexer and amplifier circuit 28 by means of a plurality of conductors 30 connected to current sensing apparatus associated with each head. The voltage multiplexer and amplifier senses the voltage for each impulse and feeds this voltage to an analogue to digital converter and control circuit 34 by means of a conductor 36. When the current is sensed, this current signal for each impulse is fed to the analogue digital converter and control circuit 34 by means of a conductor 38. The output of the analogue to digital converter and control circuit 34 is fed to the computer on a buss system 40 which feeds the digital data to the computer. The computer also is fed certain address signals to tell the computer which head is being sensed and which bank associated with that head is involved. The computer also provides a control to the analogue digital converter and control circuit 34 to control when the data is being sensed from the welding busses. This control signal is fed to the converter and control circuit 34 by means of a cable 42.

After the computer, in the case of the initial setup for the computer, has sensed all of the impulses for fourteen workpieces, the computer generates within itself a preselected impedance (indicative of temperature) curve to which the remaining welds to be performed will be compared. The computer also then does the standard deviation calculations to set limits outside of which correction will be taken. When the fifteenth workpiece is welded, the computer will then compare the fifteenth workpiece weld characteristics, in the form of the impedance of the weld, with the preselected curve and the deviation therefrom and determine whether corrections are to be made to the weld. These corrective signals are fed to the banks of welder heads by means of a weld interface circuit 46. Certain signals are generated within the computer to control the application of the corrective action to the welder interface. Also, the welder head must be closed to start the sensing operation and the computer must know when the system is in the heat mode of operation. Accordingly, cool cycle available sense signals and measurement sense signals are available to the welder interface circuit for each bank of welder heads. The output of the welder interface circuit 46 is fed to the standard welder control system by means of shortened cool cycle, for example, signals fed to bank 1 or bank 2 by means of the output conductors 50, 52.

The computer also supplies additional output signals to indicate that corrective action is being taken or that correction action cannot be taken. Accordingly, an indicator panel control circuit 54 and an indicator panel 56 is provided, these circuits 54, 56 being fed signals from the computer 22 by means of a conductor 58 to indicate that a correction is required and from the welder interface circuit 46 by means of a conductor 60 to indicate that the system is performing the required correction. The computer also is fed data from a tape reader 64 by means of a tape reader interface 66 to suitably program the computer and control of the tape reader is provided by a tape control conductor 68.

Referring now to FIG. 3, there is illustrated a multiplexer amplifier circuit 70 which is utilized to sense the voltage or current signals present at the welder heads. Particularly, the system includes a field effect transistor multiplexer circuit 72, which circuit is of the type (MPX-8A) commonly available from hybrid circuit manufacture. The input circuitry of the multiplexer includes a plurality of input terminals 74 to 88 which are interconnected with the eight welder heads being sensed in the situation of the present invention. It is to be noted that the circuit illustrated in FIG. 3 is utilized for either voltage sensing or current sensing, the two circuits being substantially identical with the exception of certain circuit parameter changes such as the value of the resistors interconnected with the output operational amplifier to be described hereinafter. The circuit includes a second field effect transistor multiplexer 90 which is provided with a similar number of input terminals 92 to 106 which are also interconnected with the welder head. The circuit is interconnected such that the upper multiplexer 72 senses the positive side of the work, in the case of voltage sensing, and the lower multiplexer circuit 90 senses the negative terminal of the work. The system is set up to be balanced such that the signals should be equal and opposite for corresponding terminals relative to ground. For example, if terminal 74 is provided with a plus five-tenths of a volt corresponding to head number 1, terminal 92 would be provided with a minus five-tenths of a volt also corresponding to head number 1.

Accordingly, the multiplexer circuit 72, 90 are continuously monitoring the voltage levels, in the case of voltage sensing, on the eight welder heads being sensed. In this situation, the system must be provided with an indication as to which head is to be sensed and the output signal provided for a particular measurement. In order to provide this information, an address is provided the multiplexer circuit 72, 90 by means of three input terminals 110, 112, 114 which provide a binary signal indicating the head address. The address input terminals 110, 112, 114 correspond to binary 1, binary 2 and binary 4, respectively. Accordingly, if head number 3 is to be addressed, terminal 110 and 112 would be provided an input signal and terminal 114 would not. These signals for input terminals 110, 112 and 114 are provided from the output circuit of FIG. 5 to be described hereinafter. These input signals are fed to both multiplexer circuits 72 and 90 by means of conductors 116, 118 and 120 and the additional input conductors illustrated. The multiplexers are also provided with a minus 15 volt DC potential at input conductor 122 and a positive 15 volt potential at an input conductor 124. The system ground is also provided by means of a conductor 126.

The output of the multiplexer circuit 72 is fed to the input circuit of an operational amplifier 130 by means of a conductor 132 for the positive side, and the negative side is fed to the negative input terminal of the operational amplifier 130 by means of a conductor 134. The operational amplifier is interconnected in a normal fashion wherein input resistors 138, 140 are connected to conductors 132, 134, respectively, at one end thereof and to ground at the other end. The gain of the operational amplifier 130 is controlled by means of a fixed resistor 142 and a variable resistor 144, these two resistors being the only change in the circuit 70 depending on whether it is being used for current sensing or voltage sensing. In the voltage sensing circuit, the resistors 142 and 144 are considerably higher than they would be if current sensing is provided. The balance of the operational amplifier 130 is controlled by means of a balance voltage divider circuit 148 and a reference potential is provided to the operational amplifier 130 by means of a resistor 150. The operational amplifier is fed positive 15 volt potential by means of a conductor 152, a negative 15 volt potential by means of a conductor 154 and ground by means of a conductor 156.

The output of the operational amplifier is fed to a sample and hold circuit 160 which samples the output signal and holds that signal for a short period of time, the signal being held to within 0.05% per millisecond droop. The output signal varies between plus and minus 5 volts and is fed to the sample and hold circuit 160 by means of a resistor 162 and a smoothing capacitor 164.

Referring now to FIGS. 4 and 5, there is illustrated the circuitry for converting the voltage and current readings from analogue to digital form and a circuit for providing an address for the particular head being sensed at any one time. The output of the system provides address data to FIG. 3 or directly to the computer, the computer providing control signals for indicating to the circuitry of FIGS. 4 and 5 when voltage or current should be read.

Referring now particularly to FIG. 4, there is illustrated a field effect transistor multiplexer circuit which is interconnected with the voltage and current output terminals from FIG. 3 to provide the multiplexer circuit 170 with the voltage and current readings. In the particular example illustrated, the voltage terminal is designated 172 and the current terminal is designated 174. The multiplexer circuit 170 includes a data conductor 176 which interconnects the multiplexer circuit 170 with an analogue to digital converter circuit 180. The data on the conductor 176 is in analogue form which is converted to digital form by the analogue to digital converter. The multiplexer is fed a 5 volt DC potential for a power supply at input conductor 182 and the multiplexer is signalled which of the input signals at terminals 172, 174 to transfer to the analogue digital converter by means of a pair of switching signals impressed on input conductors 184, 186. The signal on conductor 184 goes to a high level when the computer signals that the voltage reading is to be taken. Similarly, the signal level on conductor 186 goes high when the computer signals that the current reading is to be taken. These signals on conductors 184, 186 are derived from the circuit of FIG. 5 to be explained hereinafter.

As stated above, the analogue data on conductor 176 is fed to the analogue to digital converter 180, the conversion being accomplished and the output data is impressed on output conductors 190, 192, 194 for the 0, 1 and 2 bits, respectively, and on output terminals 196, 198, 200, 202 and 204 for the remaining bits forming the complete data output signal. It is to be noted that the computer requires all eight bits of data in order to properly interpret the signal level being fed from the welder heads. It will be noted that conductors 190, 192 and 194 are not directly connected to the computer, as is the case with terminals 196 to 204, but rather are fed through a series of gates to be described in conjunction with FIG. 5. The purpose of this circuitry will become more apparent from the description of FIG. 5. However, it is to be noted that the circuitry to be described is utilized to insure that the data being fed to the computer from the analogue to digital converter is fed during a specific period as commanded by the computer rather than arbitrary periods. Further, the analogue to digital converter provides output signals to the computer to indicate the status of the analogue to digital converter circuit 180. These terminals 206, 208 provide the converter status signal and the inverted converter status signal for use by the computer. The signals on output terminals 206, 208 signal the computer not to input data being fed thereto from conductors 190 to 204 until the status of the analogue to digital converter, as indicated by the signal levels on terminals 206, 208, reach the proper state. The signal level on terminal 208 is also fed back to the analogue to digital converter circuit by means of a conductor 210 to turn on the internal clock within the analogue to digital converter. The converter circuit 180 is of the type commonly manufactured and sold by hybrid circuitry manufacturers. Also, the control of the gain of the analogue to digital converter circuit 180 is provided by means of a potentiometer 212 which is interconnected in the converter circuit in a typical fashion. The power supply for the converter circuit is provided by input conductor 214 which is connected with a positive 5 volt direct current potential.

As stated above, the circuits of FIGS. 4 and 5 require that the multiplexer circuit 70 be switched between the voltage and current and also that the address of the head being sampled be fed to the computer and to the input circuit of FIG. 3. To this end, a switch voltage and current gate 220 is provided, the input circuit of the gate 220 being connected to an input terminal 222. The computer generates a switch voltage and current signal after the address of the head being sensed has been sensed by the computer. This switch voltage and current signal is fed to the input terminal 222, the signal being inverted by the gate 220 and fed to the analogue to digital converter circuit 180 by means of a conductor 224. The output of gate 220 is also fed through a second inverter gate 226 to again invert the signal back to its original state at terminal 222, and this signal is fed to an output conductor 228. The system also includes a step head circuit 230, the circuit including an input terminal 232 which is fed with a signal for stepping the counter which generates the address for the head being sensed. This signal at terminal 232 is fed to the switch voltage and current flip-flop circuits to be described in conjunction with FIG. 5 by means of a conductor 234. Also, the signal at input terminal 232 is fed through a pair of inverter gates 236, 238, the output of the inverter gate 238 being fed to the head counter circuit to be described in conjunction with FIG. 5 by means of a conductor 240. Immediately following the stepping of the head by means of a pulse on input terminal 232, the address to which the counter circuit has been incremented is maintained until a subsequent step head pulse is fed to terminal 232 by means of an address latch signal impressed on input terminal 244. It will be noted that a low signal on input terminal 244 will effectively shunt any high signal at the output terminal of gate 236 through conductor 246 and diode 248. Thus, any pulses which may be fed through gate 236 and which are not step head pulses, these pulses will be shunted through the circuit including connector 246 and diode 248.

Referring now to FIG. 5, and particularly to the head address counter circuit 250, it is seen that the step head pulse on conductor 240 is fed to the clock input terminal of a JK flip-flop 252 forming the first stage of the counter circuit 250. The second stage of the counter circuit 250 includes a second JK flip-flop 254, the $\overline{Q}$ output of flip-flop 252 being fed to the clock input of flip-flop 254 by means of a conductor 256. The counter circuit 250 is initialized by means of a reset pulse which is fed to an input terminal 260 by the computer. Accordingly, when four heads of each bank have been read, the flip-flop circuit 250 is reset to the zero state. Also, on initial start-up, the counter circuit 250 is reset to zero.

The output of the flip-flops 252 and 254 are fed to a first series of address gates 264 by means of a conductor 266 connected to the $\overline{Q}$ output terminal of flip-flop 252, and a conductor 268 which is connected to the $\overline{Q}$ output of flip-flop 254. This provides address information to the binary 1 gate 270 and the binary 2 gate 272. The output of gate 270 is fed through an inverter gate 274 to an output terminal 276. Similarly, the output of the two's gate 272 is fed through an inverter 278 to a two's output terminal 280. Each of the output terminals is connected to a positive 5 volt direct current potential at conductor 282, the conductor being connected to the terminals through a pair of resistors 284, 286, respectively. In the situation where the second bank of four heads is to be sensed, the computer generates a bank 2 input pulse at an input terminal 290. This pulse is fed to a binary 4 gate 292 by means of a conductor 294, the output of gate 292 being inverted by a gate 296. The output of gate 296 is connected to an output terminal 298 which may be designated the bank 2 output terminal. The terminal 298 is connected to the 5 volt potential on conductor 282 by means of a resistor 300.

Accordingly, the computer will initially generate a reset pulse at terminal 260 to reset the flip-flops 252, 254. When it is desired to sense the next head, a set head pulse will be generated by the computer at input terminal 232 in FIG. 4. This signal is fed to the clock input of flip-flop 252 through gates 236, 238 and the conductor 240. Each pulse will increment the counter formed by flip-flops 252, 254 in a binary fashion to provide an output address for the head being sensed at output terminals 276, 280 and 298. When the second bank is to be read, the bank 2 pulse is generated on terminal 290 and fed to output terminal 298 through the gates 292, 296. The signal levels at the output terminals 276, 280 and 298 are fed to the input terminals 110, 112 and 114 of FIG. 3 to indicate to the field effect transistor multiplexer circuit 72 and 90 which particular head is to be sensed. It will be recalled that a similar circuit to that described in conjunction with FIG. 3 will be provided for the other function of sensing either current or voltage and the data address terminals 276, 280 and 298 will also be fed to the input circuits of that second circuit which is identical to FIG. 3.

The switch voltage and current signal impressed on conductor 228 is fed to the input circuit of a voltage and current JK flip-flop 304 by means of a conductor 306 connected to the clock input circuit of the flip-flop 304. Accordingly, when a switch voltage and current signal is generated on the conductor 228, the JK flip-flop 304 is switched to one state or the other. The Q output of the flip-flop 304 is designated the current output and the signal is impressed on conductor 310. This output signal is fed to the input circuit of the multiplexer circuit 170 in FIG. 4, and particularly to the input terminal 186 thereof. On the other hand, the switching of the flip-flop 304 to the opposite state provides a voltage signal on an output conductor 312, this voltage signal being fed to the multiplexer circuit 170 and particularly to conductor 184 thereof. When the flip-flop 304 is reset, the Q output is at a logical one level and the $\overline{Q}$ output is at a logical zero level. This high signal at terminal 310 renders a high signal at input conductor 186 to the multiplexer circuit. As stated above, the multiplexer circuit reads the voltage signal first and subsequently the current signal. It is through the flip-flop 304 that these signals are switched.

As was stated above, the computer first drives information as to the address of the particular head being sensed. After the head address is established, the computer then reads the voltage and subsequently the current signals present at that particular head for a particular heat impulse. Accordingly, the computer must be provided with information as to the head address, this being accomplished by means of the head address information being fed to a plurality of three address gates 320 which include a binary 1 gate 322, a binary 2 gate 324 and a binary 4 gate 326. The input circuit of the binary 1 gate 320 is interconnected with the output of flip-flop 252 by means of a conductor 330. Similarly, the output of flip-flop 254 is fed to the input circuit of binary 2 gate 324 by means of a conductor 332. In order to signal the second bank of welder heads, the input terminal 290 provides a signal to the binary 4 or bank 2 gate 326 by means of a conductor 334. The outputs of the gates 322, 324 and 326 are fed through inverter gates 336, 338, 340, respectively, and then to output terminals 342, 344 and 346, respectively. These output terminals are connected to the computer to provide the computer with information as to the address of the particular head being sensed.

It is to be noted that the output gates 336, 338 and 340 are provided with a double set of input signals, the first set being provided from the gate 322, 324 and 326 to provide address information and the second set of data is provided from conductors 190, 192 and 194 through a set of gates 350, 352, 354, these latter gates being utilized to provide the three bits of digital information from the analogue to digital converter circuit 180. In order to switch the output signals being fed to output terminals 342, 344 and 346 and determine which set of data is being fed thereto, a switching circuit is provided to enable a particular set of gates 322, 324, 326 or 350, 352, 354.

This switching function is provided by a JK flip-flop circuit 360 which is fed both step head pulses and switch voltage and current pulses. The switch voltage and current pulses are fed by means of the conductor 228 and 366 and the step head information is fed by means of the conductor 234 and a conductor 368. Accordingly, when a step head pulse is generated at input terminal 232, the flip-flop 360 is switched to provide an enabling pulse at the $\overline{Q}$ output terminal. This enabling pulse is fed to the set of gates 320 by means of a conductor 370, the signal level on the conductor 370 enabling the gates. Thus, when the computer generates a step head pulse, the gates 320 are enabled and address information is fed from the gates 320 to the output terminals 342, 344 and 346. On the other hand, when it is desired to provide digital information as to the value of the voltage or current being sensed by the multiplexer circuit 170, the switch voltage and current signal enables the gates 350, 352, 354 by means of the signal generated on conductor 372. This feeds information from the conductors 190, 192 and 194 to the output terminals 342, 344 and 346. In this way, the computer controls the information being fed from the analogue to digital converter circuit 180.

Referring now to FIG. 6, there is illustrated a portion of the welder interface circuit which is interconnected with the standard welder control. As stated above, in the standard welder control there is included a circuit for generating pulses in response to the number of heat impulses being fed to the load. Also, there is a provison for timing the cool portion of the cycle by also counting pulses. These pulses are fed from the pulse generation portion of the standard welder control to a pulse counter circuit which is utilized to count the number of pulses occurring during any particular period of time and controlling the duration of heat and cool cycle in response to the counting of those pulses. It has been found that a simple way to apply the corrective action necessary to force the weld temperature to conform to a preselected curve is to either absorb one or more of those pulses to fool the system into lengthening the cool cycle due to the fact that one or more of the pulses that actually were generated were not counted or to feed the counter an additional one or more pulses to shorten the cool cycle.

Assuming that an additional pulse is to be generated, the computer provides an input pulse to a JK flip-flop circuit 380 by means of an input terminal 382 and a conductor 384. When the input pulse is received, the JK flip-flop switches to its opposite state and provides an output signal from the $\overline{Q}$ output terminal connected to conductor 386. This pulse is inverted by means of a gate circuit 388 and fed to the base of a transistor 390 through a resistor 392. The pulse at the input of the transistor 390 causes the transistor 390 to switch to the non-conductive state thereby causing the collector to rise to the approximately 5 volts connected to the upper end of a resistor 396. This positive going pulse is fed to the input circuit of a first and second AND gate 398, 400, respectively, by means of a conductor 402. The pulse is also fed to the input circuit of a first inverter gate 404 and a second inverter gate 406, the output of this latter gate 406 being fed to the reset input terminal of the JK flip-flop 380 by means of a capacitor 408 and a conductor 410. The feed back connection to the JK flip-flop 380 forms a single shot multivibrator circuit, the multivibrator circuit producing an output pulse of approximately 100 microsecond duration. The output pulse from transistor 390 being fed to gates 398, 400 is further inverted by means of a pair of inverter gates 414, 416, the output of the gates 414, 416 being fed to a pair of output transistors 418, 420, respectively. The generation of the pulse at input terminal 382 will thus generate an output pulse at output terminals 422, 424 if certain other conditions exist.

For example, the pulse should only be fed to one bank or the other depending on which bank is being sensed at that particular time. Accordingly, a bank address input terminal 428 is provided to control which output transistor 418, 420 the pulse from transistor 390 is to be fed. If the bank is bank 1, the signal level at input terminal 428 will be low, this signal being inverted by a gate 430, the output of the gate 430 being connected to the gate 398 by means of a conductor 432. Also, the signal level at input terminal 428 is fed directly to the input of gate 400 by means of a conductor 434. Thus, if bank 1 is being sensed, the input terminal 428 will be low to provide a high output signal at conductor 432. This high signal enables gate 398. On the other hand, if bank 2 is to be selected, the signal level at input terminal 428 will be high to directly enable gate 400.

The actual connection of the circuit of FIG. 6 will become more apparent after a description of the circuit of FIG. 7. For the present, it is sufficient to state that the output terminals 422, 424 are connected to the input circuit of the counter associated with the standard welder control. Thus, any signal levels generated at the output terminals 422, 424 are utilized to control the input signal levels to the standard controller counting circuit. The system senses whether a pulse is being generated in the standard welder control by means of a pair of input terminals 430, 432 which are interconnected with the output circuit of the pulse generator circuit in the standard welder controller. The terminal 430 is associated with bank 1 and the terminal 432 is associated with bank 2, each terminal being connected to the base electrode of a transistor 434, 436 respectively. The output of the transistor 434 is fed to the input circuit of a converter gate 438 and the output of transistor 436 is fed to a second inverter gate 440. Effectively, the transistors 434, 436 and gates 438, 440 provide a voltage conversion from, for example, 20 volts associated with the standard welder controller, to 5 volts which is utilized in the circuitry illustrated. Accordingly, the signal levels at the output of the pulse generator in the standard welder controller is sensed by means of terminals 430. The heat and cool cycle is illustrated immediately above transistor 434, the cool cycle being illustrated first and the heat portion of the cycle being illustrated second. It is to be noted that upon determination of the heat cycle, the cool cycle commences and a slight delay, approximately two milliseconds, occurs before a corrective pulse is generated. This corrective pulse is signalled by an input signal at input terminal 382.

The corrective action, in the preferred embodiment, is taken during the cool portion of the cycle. Accordingly, the computer must sense when the heat portion of the cycle is over. This signal is generated within the computer and fed to a pair of input terminals 448, 450, the signal levels on terminals 448, 450 inhibiting the output of gates 438 and 440 during the period that the heat portion of the cycle is occurring. When the cool portion occurs, the output signals from gates 438, 440 are utilized to effect or enable the gates 398 and 400.

Referring now to FIG. 7, there is illustrated a circuit for interconnecting the circuit of FIG. 6 with the standard welder control. The circuit 460 of FIG. 7 includes an input terminal 462 and an output terminal 464, the two terminals 462, 464 being adapted to be interconnected with the standard welder control circuit. Particularly, the terminal 462 is connected to receive the pulse occurring during the heat and cool times and the terminal 464 is adapted to be associated with the input circuit of the pulse counter of the standard welder control. The terminal 462 is connected with the standard welder control system to provide the circuit 460 with the pulse generated by the pulse generator section of the standard welder control. These pulses are fed to an output terminal 466, the output terminal 466 being adapted to be interconnected with the input terminal 430 of FIG. 6. Thus, the pulse is fed from terminal 462 to terminal 466 through a conductor 470. The input terminal to the circuit 460 is designated at 472, the terminal 472 being adapted to be connected to the output terminal 422 described in conjunction with FIG. 6. The connection between terminal 462 and terminal 464 is rendered electrically isolated due to a diode 478 connected therebetween. The terminal 464 is connected to a source of 20 volt direct current potential at terminal 480 by means of a resistor 482. The terminal 472 is also connected to the 20 volt source of potential through a resistor 484. The path between terminals 464 and 472 includes a diode 486, the diode 486 being conductive when the terminal 472 is low and being non-conductive when the terminal 472 is high. In this latter situation, it will be seen that the transistor 418 descirbed in conjunction with FIG. 6 has been rendered non-conductive.

When it is desired to generate an additional pulse at the output terminal 464, the circuit including transistor 418 is rendered non-conductive thereby shutting off the flow of current from the source of 20 volt potential at 480, through resistor 482 and diode 486 to terminal 472.

When it is desired to generate an output pulse at terminal 464, the terminal 472 is effectively disconnected from ground due to the non-conductive condition of transistor 418. This terminates the flow of current through diode 486 and thereby raises the potential of terminal 464 to the approximately 20 volt level at conductor 480. This produces an output pulse which is fed to the counter circuit of the standard welder control to be counted as a cool cycle pulse. Thus, the system is fooled into counting more pulses than were actually generated within the standard control circuit. In this way the cool cycle is shortened. On the other hand, if it is desired to absorb a pulse, terminal 464 is then connected to ground through the conductive condition of transistor 418. In this way the pulse generated within the standard control circuit is shunted to ground through the terminal 464, the diode 486, the terminal 472 and transistor 418.

Referring now to FIG. 8, there is illustrated a single shot multivibrator circuit 490 which is identical in operation to that described in connection with the upper portion of FIG. 6. However, the single shot multivibrator circuit 490 generates a two millisecond pulse rather than the 100 microsecond pulse described in conjunction with FIG. 6. The purpose of the circuit illustrated in FIG. 8 is to provide an inhibit pulse for the signals fed to input terminals 448 and 450 in FIG. 6. It is desired to inhibit these pulses for a preselected period, in this case two milliseconds, after the start of the generation of the pulse produced by the single shot multivibrator described in conjunction with FIG. 6. In this way, it is impossible to generate a number of cool pulses in rapid succession. It is desired to generate cool pulses for use by the standard controller only at a rate greater than two milliseconds apart.

Particularly, the circuit includes an input terminal 492 which is fed the identical pulse and at the same time that that pulse is fed to terminal 382. The single shot multivibrator circuit 490 includes a JK flip-flop 494, the output of which is connected to an output terminal 496. The output terminal provides a signal to the circuit which produces the pulses at 448 and 450. Thus, the system is unable to produce pulses for terminal 448 or 450 for two milliseconds after the start of the input pulse which is generated and fed to terminal 492.

As was the case with FIG. 6, the output of the JK flip-flop 494 is fed through an inverter gate 498 to a transistor 500 through a capacitor 502. The capacitor is charged in accordance with the RC time constant of a circuit including a resistor 504 and the capacitor 502. The discharge of capacitor 502 is determined by a RC circuit including a resistor 506 and the capacitor 502. The output of transistor 500 is fed through a pair of inverter gates 508, 510, the output of gate 508 being fed to the reset circuit of flip-flop 494 through a capacitor 514 and a conductor 516. the operation of the circuit is illustrated to the right of FIG. 8 wherein the upper pulse is a waveform indicating the form of the output pulse at terminal 496. The second wave indicates the form of the voltage at the base of transistor 500 and the lowermost voltage illustrates the waveform at the output of gate 498. It will be noted that the output spike generated to the left of capacitor 514 resets the flip-flop 494.

FIG. 9 illustrates a pair of gates 515, 517 which are utilized to sense when the welder heads are closed, the gate 515 corresponding to bank 1 and the gate 517 corresponding to bank 2. These signals are generated by limit switches at the heads and the output terminals are connected to the computer. Gate 519 is merely used as an inverter to invert signals.

Figure 10:
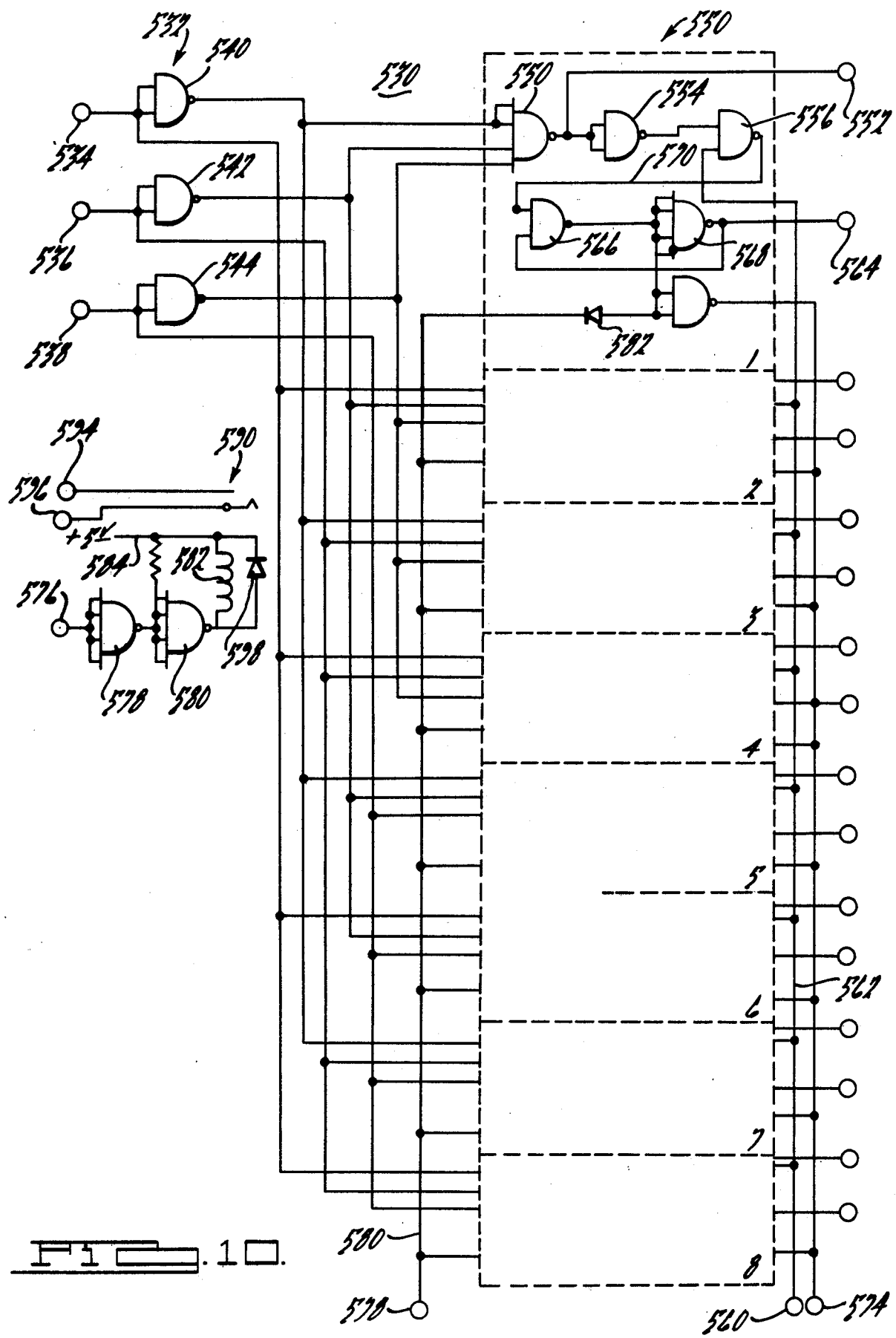
FIG. 10 is a schematic diagram illustrating the details of an indicator control circuit for providing information as to when a correction is being made.

Referring now to FIG. 10 there is illustrated a lamp indicator circuit 530 which is utilized to indicate when corrective action is being taken by the computer. The circuit includes an address buss input circuit 532 which includes three input terminals 534, 536, 538 which correspond to the binary address of the particular head being sampled. In the particular situation illustrated, the terminal 534 corresponds to the binary 1 signal, terminal 536 corresponds to the binary 2 signal and terminal 538 corresponds to the binary 4 signal. The signals fed to input terminals 534, 536 and 538 are fed through inverter gates 540, 542 and 544, respectively. The signals at the output terminals of the gates 540, 542 and 544 and the signals at input terminals 435, 536 and 538 are fed to a plurality of eight flip-flop circuits 550, the connections between the input terminals 534 and 536 and 538 and the flip-flop circuits 500 being in a standard binary to decimal conversion configuration.

Referring now to the details of the flip-flop circuits, it is seen that the signals from terminals 534, 536 and 538 are fed to certain input gates 550, the upper flip-flop circuit corresponding to decimal number one being illustrated in complete detail. The output of gate 550 is fed directly to an output terminal 552 corresponding to one side of the output circuit. The signal is also fed forward through an inverter gate 554 and an AND gate 556. The AND gate 556 also includes an enabling signal generated in the computer and fed to an input terminal 560. The input terminal 560 is connected to all of the gates corresponding to gate 556 in each of the eight flip-flop circuits by means of conductor 562. The computer generates the alarm signal at input terminal 560 when corrective action is being taken. This corrective action signal is fed to enable all of the flip-flop circuits one through eight. When a particular welder head is being sensed, the address of the sensed welder head will appear at the corresponding flip-flop circuit. The enable signal at terminal 560 and the address signal causes an output signal to occur at a second output terminal 564.

The output signal at terminal 564 is generated by a flip-flop formed by a pair of gates 566, 568, the input circuit of the flip-flop being connected to a conductor 570. When the gate 568 is at one particular state, this condition is fed back to the input circuit of gate 566 to be anded with the signal from the output of gate 556. When the two signals are present at the input circuit to gate 566, the output signal will be generated at output terminal 564.

The generation of the correction action signal for a particular address is fed down to an output terminal 574 to provide an indication that an alarm exists. This alarm signal is fed to an input terminal 576 to energize a lamp circuit to be explained hereinafter. The flip-flop is reset by means of a signal generated at a reset terminal 578, the terminal 578 being connected to all the flip-flop circuits by means of a conductor 580 and a diode 582. Any suitable alarm device may be connected to terminals 552, and 564 to provide an indication that corrective action has been taken at a particular address.

The alarm system also includes the circuit connected to input terminal 576 wherein the signal level at terminal 576 is fed through an inverter gate 578 and a second inverter gate 580. The inverter gate 580 is connected at its output terminal to a coil 582, the upper end of the coil 582 being connected to a positive 5 volt direct current potential at conductor 584. When the alarm signal exists, the output of gate 580 goes low to permit current to flow through the coil 582. This pulls up a relay switch 590 which closes a circuit between a pair of terminals 594, 596. In this way the existence of an alarm is signalled. A diode 598 is also provided to absorb the inductive kick of the coil 582.

Referring now to FIGS. 11 to 14, there is illustrated the general details of the program utilized in conjunction with controlling the system of the present invention. The details are given only with sufficient specificity to enable one skilled in the art to practice the invention. For purposes of illustration, the invention, and the associated software will be described in conjunction with welding wheels on a manufacturing line. The welding heads for the wheels are broken down into two banks of four welder heads per bank. The wheel is advanced down the line to the first bank of welder heads and four spot welds are made on the wheel simultaneously. The computer senses each weld impulse for each welder head and makes the calculations for the impedance. The wheel is then advanced to the second bank of welder heads and an additional four welds are performed simultaneously on the wheel.

Figure 11:
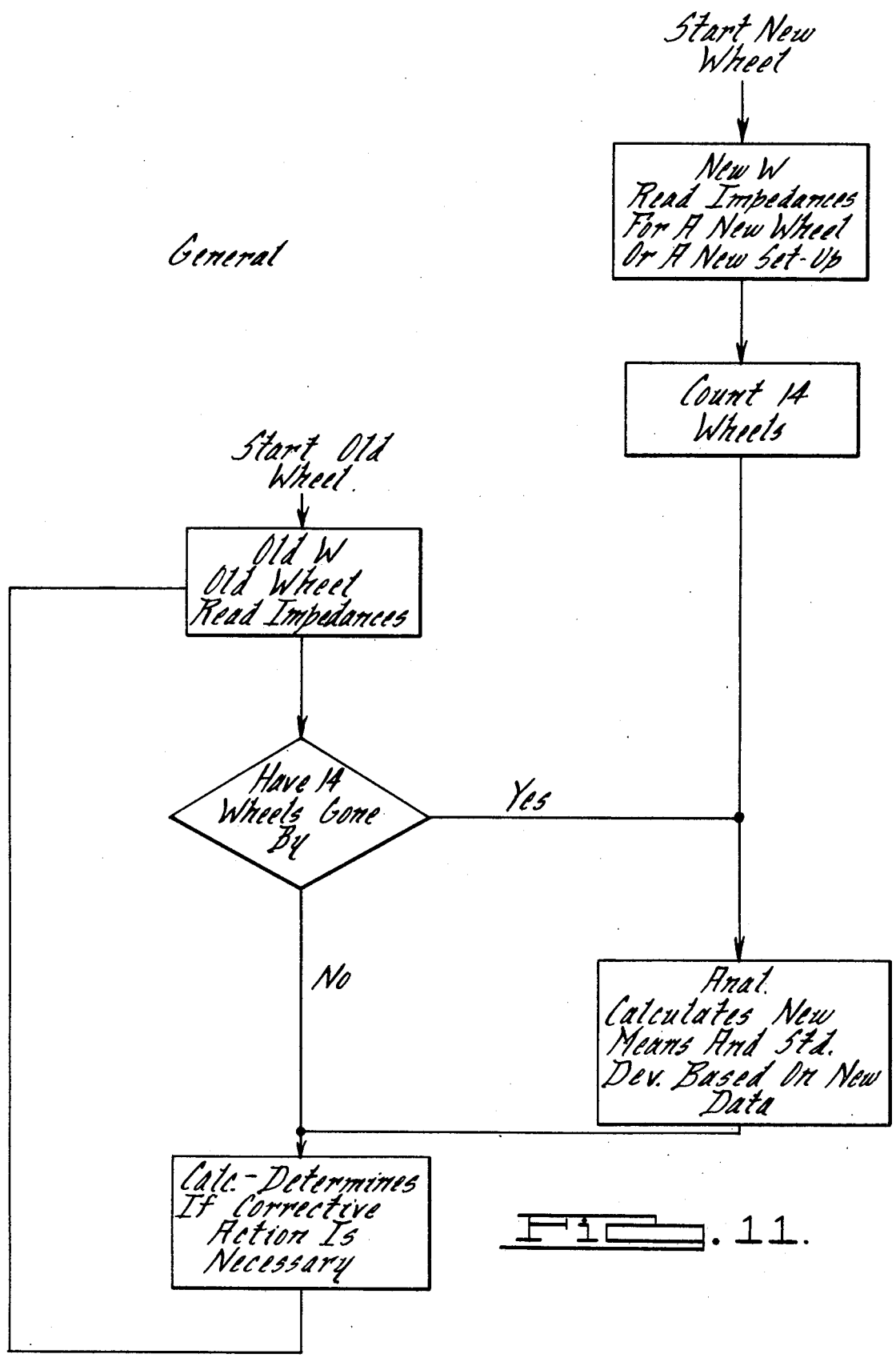
FIG. 11 is a flow chart illustrating the general details of the overall computer program.
Figure 12:
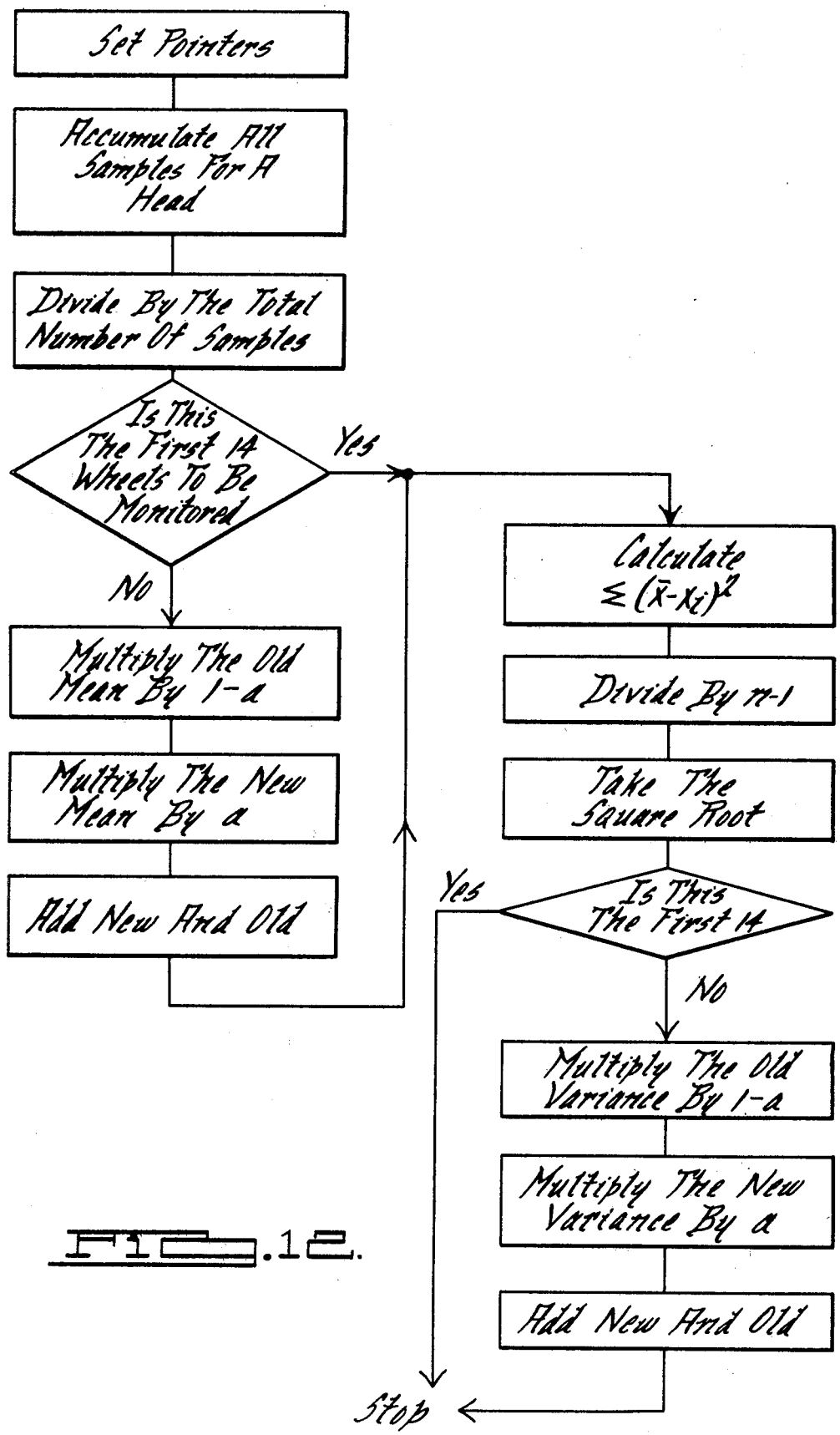
FIG. 12 is a flow chart illustrating the general details of the subroutine analyzing and calculating the mean curve, the standard deviation, and the weighting routine for updating data in the computer.
Figure 13:
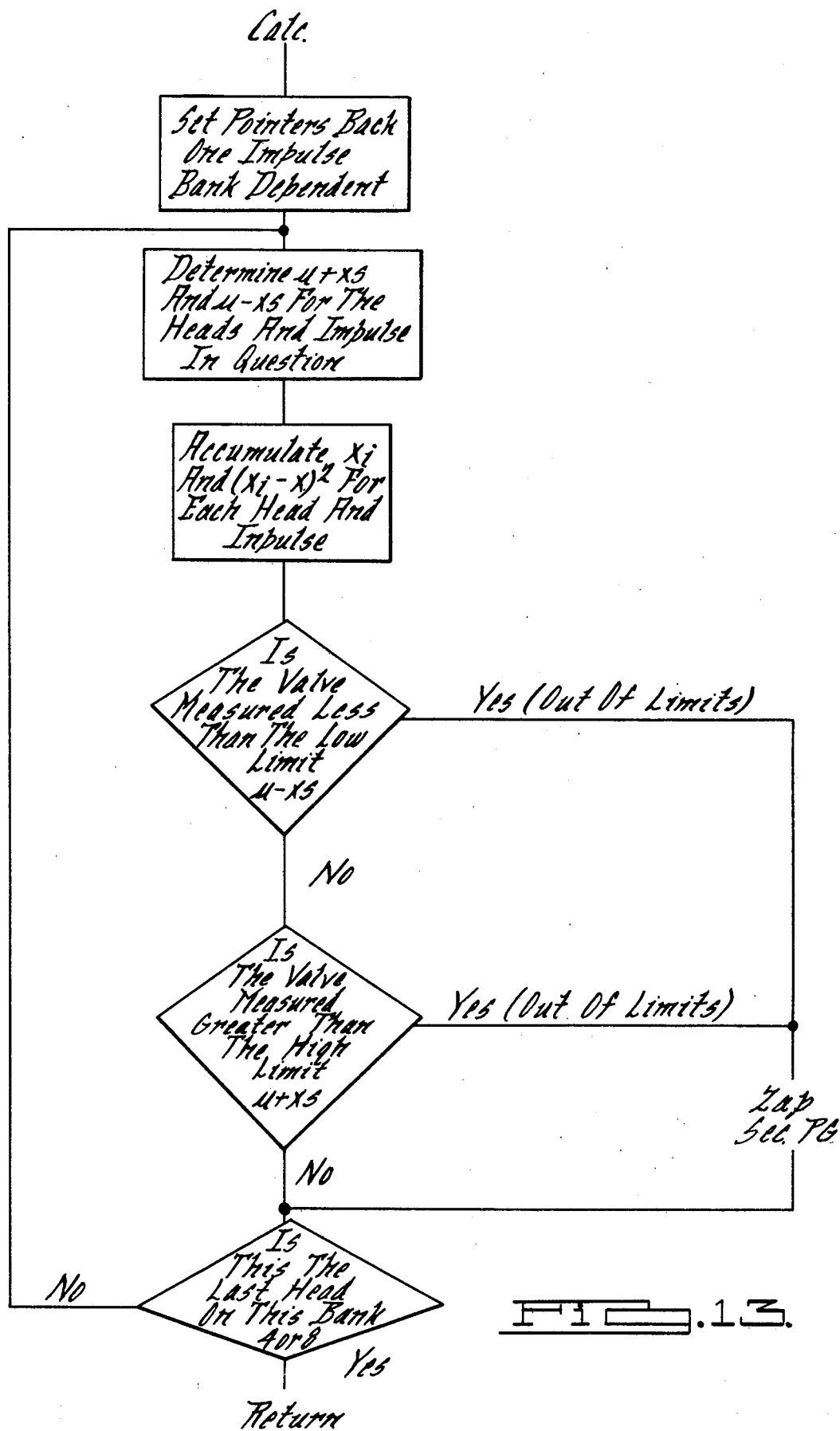
FIG. 13 is a flow chart illustrating the general details of the subroutine for calculating when a correction is to be made.
Figure 14:
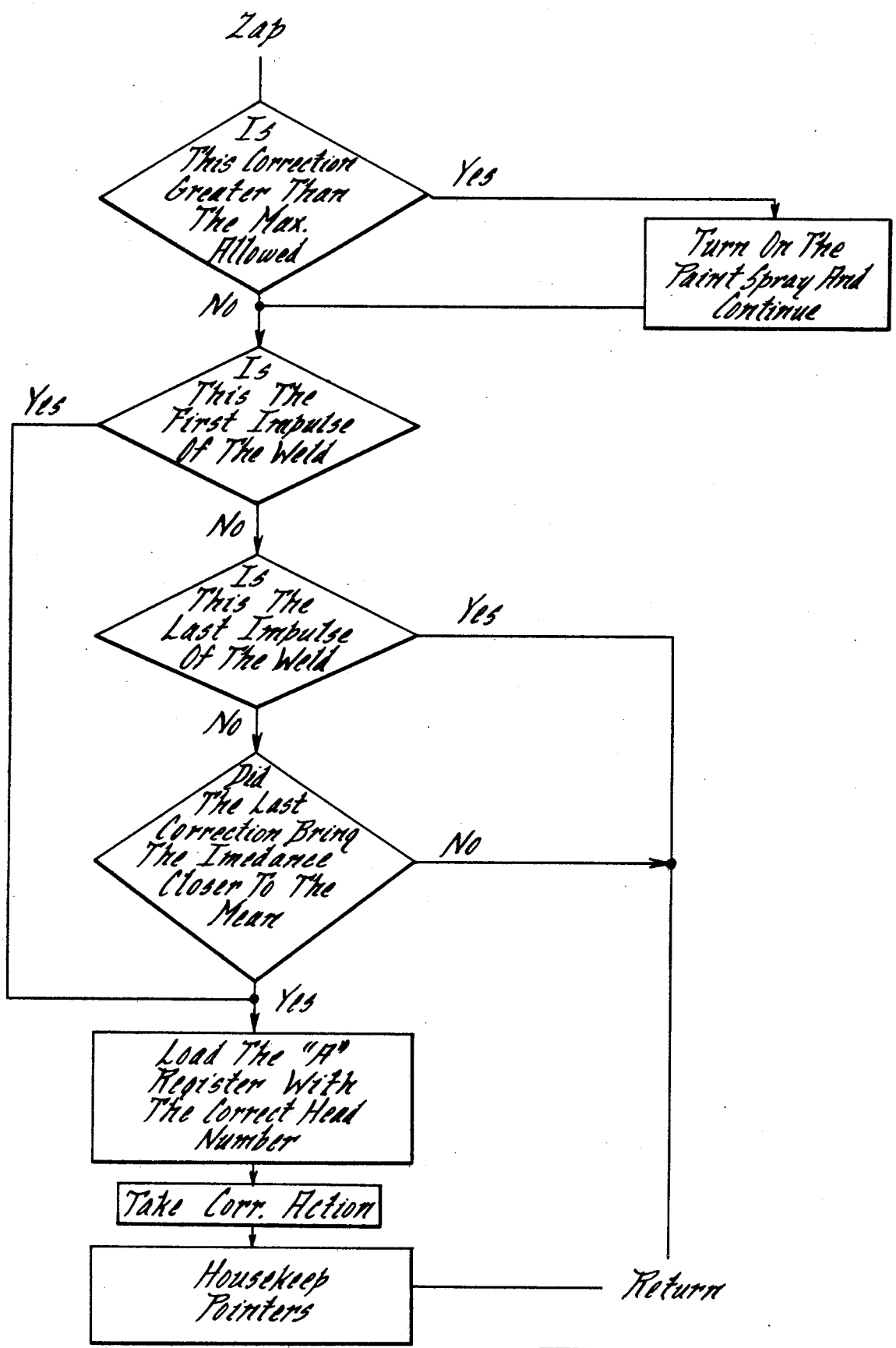
FIG. 14 is a flow chart illustrating the subroutine for accomplishing the correction and indicating when a weld is progressing out of limits.

Referring now particularly to FIG. 11, it is seen that the flow chart illustrates the steps in performing those welds and taking corrective action. The subroutines which are utilized in the general program are illustrated in FIGS. 12 to 14 and will be described hereinafter. The system initially starts up by calculating a curve for fourteen of the first line of wheels which are welded. Typically, this initial set up is performed with substantially ideal conditions, that is, new electrodes, clean work and proper spacing between portions of the workpiece. After the initial fourteen wheels have been welded, the wheels are destructively tested to determine if the welds are proper. If they are proper, the data fed into the computer is utilized to calculate the curve to which subsequent welds will be compared.

Accordingly, the new wheel initialization of the computer is started. There is provided a push button on the apparatus to indicate to the computer that a new wheel start up is being performed. As is seen in the first block under the start new wheel heading, the new wheel impedances are read and fed to the computer. The next block indicates that fourteen wheels are to be counted for the initial run and set up. The system then goes to the analysis subroutine, to be explained in conjunction with FIG. 12, and calculates the new mean and standard deviation curves based on the new data fed from the fourteen wheels.

After the analysis subroutine is performed, the system then starts to perform welds on the fifteenth and subsequent wheels. The system then goes to the calculate subroutine to be described in conjunction with the description of FIG. 13. The calculate subroutine generally determines whether correction action is necessary and performs the corrective action in accordance with the sensed impedance of the wheel.

This calculation is performed under the old wheel routine which starts with the reading of the old wheel impedances as indicated in the first block of the start old wheel routine. The system also counts the number of wheels that have passed and provides an indication when fourteen wheels have gone by. If fourteen wheels have gone by at the decision point indicated the system switches to the analysis subroutine to update the data in the computer as will be seen from a description of FIG. 12. In either event, fourteen wheels have not gone by or fourteen wheels have gone by, the system switches to the calculate routine to determine if corrective action is necessary and performs that corrective action.

Referring now to FIG. 12, there is indicated the analysis subroutine of the program. As indicated in the flow chart the analysis subroutine starts out by setting the pointers in the computer. The system then accumulates all the samples for a particular head. Thus, each impulse for each head for all fourteen wheels are accumulated. Subsequently the computer divides the total number of samples taken into the sum of the samples taken to derive an average sample. The subroutine then goes to a decision state to determine if this is the first fourteen wheels to be monitored. If the answer is yes, the system then goes into the portion of the subroutine indicated at the lower right of the flow chart in FIG. 12.

The first step is to calculate the summation of the mean impedance less the impedance under consideration squared. Subsequently, the above calculation is divided by the number of values taken minus one and the square root of that value is taken. In this way the mean curve is determined. The system then goes to the decision step of asking the question whether this is the first fourteen wheels or not. If it is the first fourteen wheels then the routine goes to stop or back to the main program. if it is not the first fourteen wheels, then the old data is upgraded by an exponential smoothing function. As indicated in the first step, the old variance is multiplied by one minus alpha, alpha being the weighting factor. In the typical system of the present invention, alpha is calculated to be a relatively small number in the order of one-tenth or two tenths. Accordingly, the new data would have 10 or 20% weighting while the old data would have 90 or 80% weighting, respectively. The next step is multiplying the new variance to the new wheel by alpha and the final step is adding the new variance after weighting and the old variance after weighting.

Referring back to the fourteen wheel decision step, if the answer is no, the old mean is multiplied by one minus alpha and the new mean is multiplied by alpha. Again, the old and new means are added to provide a new temperature curve. The routine then goes to the calculation routine described above.

Referring now to FIG. 13, there is illustrated the calculate subroutine. In the calculate subroutine, it is necessary to set the pointers of the computer back one pulse to again look at the information for the previous head which was stored. The system then determines the standard deviation, both plus and minus, for the head and impulse in question. In this case, $m\mu$ is the old mean calculated previously and stored in the computer. The standard deviation is also programmed into the computer. In this way, the computer determines the limits outside of which corrective action will be taken and without which, if the weld remains, the corrective action is ineffective and the wheel will be marked as having a bad weld. The next step in this subroutine is to accumulate the resistance for the head and impulse in question and determine the square of the resistance for the head in question less the average resistance already calculated by the computer. These values are accumulated in the computer.

The subroutine then reaches a decision point and the question is asked whether the value measured is less than the low limit determined by the standard deviation from the mean curve. If the answer is yes, the system then switches to the ZAP subroutine to be described in conjunction with the description of FIG. 14. If the answer is no the second decision stage is reached and the question is asked whether the value measured is greater than the high limit. If the answer is yes, the system then switches again to the ZAP routine. If both answers are no, the system then determines if this is the last head on this bank. This is determined by sensing whether head number four or head number eight is being compared with the standard deviation. If the answer is yes, the system then returns to the main program. If the answer is no, then the system returns to the start of the calculate subroutine with the exception that the pointers are not set back.

Referring now to the ZAP subroutine, it is seen that the first decision stage is to determine whether the correction is greater than a maximum programmed into the computer. The computer has been fed certain maximum corrections which will be made. If the weld is out of limits sufficiently to exceed these maximum deviations programmed into the computer, the computer then decides that the weld cannot be corrected and a signal is generated to turn on a paint spray to mark the wheel. If the answer is no, the next decision stage is reached to determine whether this is the first impulse of the weld. If it is the first impulse then corrective action is taken and the system reverts to the corrective action portion of the subroutine. The first step in this corrective action portion is to load the registers with the correct head number to indicate to the system which head is being corrected. The next step is to take the corrective action necessary to bring the welds into closer comparison with the mean temperature curve. Finally, the system housekeeps the pointers in the computer and returns to the main program.

Referring back to the first impulse decision step, if the answer to the question of whether this is first impulse of the weld is no, then the routine switches to the next decision step wherein it is asked the question is that the last impulse of the weld. If it is the last impulse of the weld, then no further corrective action can be taken as there will be no further impulses within which the corrective action could be taken. Thus, the system then returns to the main program. If the answer is no, then the next question asked is whether the last correction brought the impedance of the weld being performed closer to the mean. It is possible that a corrective action would not bring the impedance closer to the mean and under these circumstances it is not desired to take any further corrective action. Accordingly, if the answer is no, then the system returns to the main program. If the answer is yes, then the system goes into the corrective portion of the subroutine to take the necessary corrective action to bring the impedance closer to the mean. This is accomplished as described above wherein the registers are loaded with the correct head address and the corrective action is taken.

It is contemplated that the inventive concepts and principles herein disclosed may be variously otherwise embodied and it is intended that the appended claims cover alternative embodiments except insofar as limited by the prior art.

What is claimed is:

1. A welding control system for a pulse welder having a welding cycle including heat portions and cool portions, the pulse welder including at least one welding head, a source of welding pulses of preselected duration, a standard control circuit for generating a standard connected between the source and the welding head for controlling the application of alternate of the head and cool portions to a welding load by controlling the number of welding pulses fed to the load during the heat portion and the duration of the cool portion, the standard control circuit including means for generating a series of clock pulses for controlling the duration of the heat and cool portions of the welding cycle of the load by counting a preselected number of clock pulses in the heat and cool portions of the cycle, the improvement comprising means connected to the standard control circuit for altering the duration of the heat and/or cool portions of the cycle counted by the standard control including sensing means for sensing a first set of voltage and current characteristics flowing in the load during a heat portion, means for generating a varying standard impedance characteristic from said sensed first set of voltage and current characteristics flowing in the load, an interface circuit connected to the current and voltage sensing means and said impedance characteristic generating means for feeding the voltage and current signals to said impedance characteristic generating means, said sensing means sensing and feeding a second set of voltage and current characteristics to said impedance characteristic generating means, said generating means generating a second impedance characteristic from said second set, and means for comparing said second impedance characteristics of the weld with the standard impedance characteristic and generating a pulse by pulse altering signal when the sensed impedance characteristic is not within the generated standard characteristics, said altering means connected to the standard control for altering the heat and/or cool portions to maintain said second impedance characteristic within limits of said standard characteristic.

2. The improvement of claim 1 wherein said sensing means for sensing the voltage and current includes a multiplexer and amplifier circuit for each of said voltage and current sensing means.

3. The improvement of claim 1 wherein said interface circuit includes an analogue to digital converter for converting the analogue voltage and current signals to digital signals.

4. The improvement of claim 2 wherein said analogue to said digital converter includes a control circuit for controlling when said voltage current signals are sensed.

5. The improvement of claim 4 wherein said impedance characteristics generating means generates the control signal for controlling when the voltage and current are sensed.

6. The improvement of claim 1 wherein said altering means includes an interface circuit for connecting said characteristic generating means to the welder heads.

7. The improvement of claim 1 further including indicator circuit means for indicating the relationship of the standard impedance characteristic and the sense impedance characteristic, said circuit including means for indicating when said standard impedance and said sensed impedance characteristics exceed certain values.

8. The improvement of claim 7 wherein said comparing means compares the standard impedance characteristics with the sensed impedance characteristics and generates said indicator signal when said sensed impedance characteristics differ algebraically from said standard impedance characteristics by a preselected amount.

9. The improvement of claim 2 wherein said multiplexer circuit includes a first and second multiplexer, said first multiplexer sensing the positive side of the load and said second multiplexer sensing the negative side of the load.

10. The improvement of claim 9 wherein said multiplexers include field effect transistors and further include first and second output terminals for generating a positive and negative signal in response to the sensing of preselected values of voltage and/or current.

11. The improvement of claim 10 wherein said pulse welder includes a multiplicity of welding heads, said control system including a circuit for generating a coded address for each of said multiple heads.

12. The improvement of claim 11 wherein said coded address generating circuit generates a binary coded address for each welded head being sensed, said binary coded addresses being fed to each of said multiplexer circuits to control which of said input voltage and/or current signals are fed to the output signals.

13. The improvement of claim 12 wherein said voltage and current sensing circuits include an output circuit having an operational amplifier, said positive output of one of said multiplexer circuits being fed to the positive input of said operational amplifier and the negative output of the other of said multiplexer circuits being fed to the negative input of said amplifier.

14. The improvement of claim 13 further including a smoothing circuit connected to the output terminal of said operational amplifier.

15. The improvement of claim 1 wherein said pulse welder includes a multiplicity of welding heads, the improvement including an address generator circuit for identifying each of said multiple welding heads.

16. The improvement of claim 15 wherein said address circuit includes a binary counter which is stepped in response to the feeding of input pulses to the input circuitry of said binary counter.

17. The improvement of claim 16 wherein said characteristic generating means includes means for generating said input pulses for said binary counter, said last named generating means generating an initial reset pulse which is generated in coincidence with the sensing of the first of said multiple heads, said last named generating means generating further pulses to increment said binary counter to establish said address for each of said multiple heads.

18. The improvement of claim 17 wherein said increment pulses also control the feeding of said address pulses back to said characteristic generating means and to the remaining portion of the welding control system.

19. The improvement of claim 18 wherein said multiple heads are divided into a multiple bank of heads, said pulses incrementing said binary counter for a portion of said address and said last named generating means generating a direct pulse to indicate the bank for the address generated by the binary counter.

20. The improvement of claim 19 wherein said output of said binary counter and said bank address are fed through a plurality of inverter gates to provide driver current for said address signals to be utilized in the welding control system.

21. The improvement of claim 5 wherein said interface means further includes a multiplexer circuit for receiving the voltage and current signal from said sensing means, and means connected to said multiplexer circuit for generating signals for switching the multiplexer circuit from sensing voltage to sensing current.

22. The improvement of claim 21 wherein said switching signal is fed to a bi-stable device, a first switching signal switching from voltage to current, and a second signal switching from current to voltage.

23. The improvement of claim 22 wherein said multiplexer circuit is connected to feed analogue data to said analogue to digital converter circuit, said analogue to digital converter circuit converting both said voltage and current data from analogue form to digital form, said analogue to digital circuit being switched to the conversion state in response to said switched voltage and current pulses.

24. The improvement of claim 23 wherein said analogue to digital converter circuit includes a plurality of output bits, all of said digital bits being required by said characteristic generating means to sense a value for either said voltage or said current.

25. The improvement of claim 24 wherein said pulse welder includes a multiplicity of welding heads, the improvement including an address generator circuit for identifying each of said multiple welding heads.

26. The improvement of claim 25 wherein said address circuit includes a binary counter which is stepped in response to the feeding of input pulses to the input circuitry of said binary counter.

27. The improvement of claim 26 wherein said characteristic generating means includes means for generating said input pulses for said binary counter, said characteristic generating means generating an initial reset pulse which is generated in coincidence with the sensing of the first of said multiple heads, said last named generating means generating further pulses to increment said binary counter to establish said address for each of said multiple heads.

28. The improvement of claim 27 wherein said increment pulses also control the feeding of said address pulses back to said characteristic generating means and to the remaining portion of the welding control system.

29. The improvement of claim 28 wherein said multiple heads are divided into a multiple bank of heads, said pulses incrementing said binary counter for a portion of said address and said last named generating means generating a direct pulse to indicate the bank for the address generated by the binary counter.

30. The improvement of claim 29 wherein said output of said binary counter and said bank address are fed through a plurality of inverter gates to provide driver current for said address signals to be utilized in the welding control system.

31. The improvement of claim 30 wherein said address data bits are fed to a second set of output gates, and a portion of said voltage and current digital bits are fed to a third set of outputs gates, said system further including a plurality of data buss gates connected to said characteristic generating means to feed either address data or current or voltage data.

32. The improvement of claim 31 wherein said address data is switched to feed the said characteristic generating means with address data in response to the generation of the incrementing pulse for said binary counter.

33. The improvement of claim 32 wherein said switch voltage and current pulse feed the three bits of voltage and current data to said output gates in response to the generation of said switch voltage and current pulse.

34. The improvement of claim 6 wherein an interface circuit includes a circuit connected to sense the heat and cool impulses generated within the standard control circuit and to provide an input to a counter circuit within the standard control.

35. The improvement of claim 34 further including means for generating an altering pulse for shortening the cool time, said pulse being fed from said cool shortening generating means, through said interface circuit, to the counting circuit of the standard control to fool the standard control into counting a pulse not generated within the standard control.

36. The improvement of claim 35 wherein said cool shortening generated signal is fed through a single shot multivibrator circuit to provide a constant length pulse to be fed to said pulse counting circuit of said standard welder control.

37. The improvement of claim 36 wherein said multiple heads are divided into two banks of heads, said altering generated pulse being steered as to which bank the pulses to be counted for which bank in response to a bank address signal.

38. The improvement of claim 37 further including a second single shot multivibrator circuit having a time constant greater than said first single shot multivibrator circuit, said second single shot multivibrator circuit being provided with an input signal for generating said additional pulse, said second single shot multivibrator circuit inhibiting the output of any further input pulses for a preselected period of time.

39. The improvement of claim 38 wherein said interface means further includes a multiplexer circuit for receiving the voltage and current signal from said sensing means, said characteristic generating means generating signals for switching the multiplexer circuit from sensing voltage to sensing current.

40. The improvement of claim 39 wherein said switching signal is fed to a bi-stable device, one switching signal switching from voltage to current, and a second switching signal switching from current to voltage.

41. The improvement of claim 40 wherein said multiplexer circuit is connected to feed analogue data to said analogue to digital converter circuit, said analogue to digital converter circuit converting both said voltage and current data from analogue form to digital form, said analogue to digital circuit being switched to the conversion state in response to said switched voltage and current pulses.

42. The improvement of claim 41 wherein said analogue to digital converter circuit includes a plurality of output bits, all of said digital bits being required by said characteristic generating means to sense a value for either said voltage or said current.

43. The improvement of claim 42 wherein said pulse welder includes a multiplicity of welding heads, the improvement including an address generator circuit for identifying each of said multiple welding heads.

44. The improvement of claim 43 wherein said address circuit includes a binary counter which is stepped in response to the feeding of input pulses to the input circuitry of said binary counter.

45. The improvement of claim 44 further including means for generating said input pulses for said binary counter, said last named generating means generating an initial reset pulse which is generated in coincidence with the sensing of the first of said multiple heads, said last named means generating further pulses to increment said binary counter to establish said address for each of said multiple heads.

46. The improvement of claim 45 wherein said input pulses also control the feeding of said address pulses to the remaining portion of the welding control system.

47. The improvement of claim 46 wherein said multiple heads are divided into a multiple bank of heads, said pulses incrementing said binary counter for a portion of said address and said last named generating means generating a direct pulse to indicate the bank for the address generated by the binary counter.

48. The improvement of claim 47 wherein said output of said binary counter and said bank address are fed through a plurality of inverter gates to provide driver current for said address signals to be utilized in the welding control system.

49. The improvement of claim 48 wherein said address data bits are fed to a second set of output gates, and a portion of said voltage and current digital bits are fed to a third set of output gates, said system further including a plurality of data buss gates connected to said characteristic generating means to feed either address data or current or voltage data.

50. The improvement of claim 49 wherein said address data is switched to feed the said characteristic generating means with address data in response to the generation of the incrementing pulse for said binary counter.

51. The improvement of claim 50 wherein said switch voltage and current pulse feed the three bits of voltage and current data to said output gates in response to the generation of said switch voltage and current pulse.

52. In a welding control system for a pulse welder having a welding cycle including heat portions and cool portions, a source of welding pulses of preselected duration, a pulse welder including at least one welding head, a standard control circuit for generating a standard connected between the source and the welding head for controlling the application of alternate of the heat and cool portions to a welding load by controlling the number of welding pulses fed to the load during the heat portion and the duration of the cool portion, the standard control circuit including means for generating a series of clock pulses for controlling the duration of the heat and cool portions of the welding cycle of the load by counting a preselected number of clock pulses in the heat and cool portions of the cycle, an improvement method comprising the steps of altering the duration of heat and/or cool portions of the cycle counted by the standard control, sensing a first set of voltage and current characteristics flowing in the load during a heat impulse, generating a varying standard impedance characteristic from said first set of characteristics, sensing a second set of voltage and current characteristics, comparing impedance characteristics of the second set with the standard impedance characteristic, and generating an altering signal when the sensed impedance characteristic is not within the standard characteristics, and altering the heat and/or cool portions in response to the altering signal to maintain said second impedance characteristic within preselected limits of said standard characteristics.

53. The method of claim 52 wherein said characteristic generating means includes means for generating the control signal for controlling when the voltage and current are sensed.

54. The method of claim 52, further including the step of indicating the relationship of the standard impedance characteristic and the sense impedance characteristic when said standard impedance and said sensed impedance characteristics exceed certain values.

55. The method of claim 54 wherein said comparing means compares the standard impedance characteristics with the sensed impedance characteristics and generates said indicator signal when said sensed impedance characteristics differ algebraically from said standard impedance by a preselected amount.

56. The method of claim 52, further including the step of generating a binary coded address for each welded head being sensed, said binary coded address being fed to control which of said input voltage and/or current signals are fed to said characteristic generating means.

57. The method of claim 56, further including wherein said sensed data is analogue data, the method further including converting both said voltage and current data from analogue form to digital form.

58. The improvement of claim 52 wherein said comparing means generates a pulse for shortening the cool time, said pulse being fed from said comparing means to the standard control to cause the standard control into counting a pulse not generated within the standard control.

* * * * *